United States Patent [19]
Tomono et al.

[11] Patent Number: 5,589,239
[45] Date of Patent: Dec. 31, 1996

[54] VARIABLE-ANGLE OPTICAL DEVICE WITH OPTICALLY TRANSPARENT SUBSTANCE

[75] Inventors: Haruo Tomono, Kanagawa-ken; Naoki Kobayashi; Toshiyuki Nakajima, both of Tokyo; Takashi Kai, Kanagawa-ken; Masayoshi Sekine, Tokyo; Masahiro Watabe; Kazuhiro Ohki, both of Kanagawa-ken, all of Japan

[73] Assignee: Canon Kabushiki Kaisha, Tokyo, Japan

[21] Appl. No.: 120,230

[22] Filed: Sep. 14, 1993

Related U.S. Application Data

[63] Continuation of Ser. No. 429,613, Oct. 31, 1989, abandoned.

[30] Foreign Application Priority Data

| Nov. 2, 1988 | [JP] | Japan | 63-277646 |
| Nov. 2, 1988 | [JP] | Japan | 63-277647 |
| Nov. 2, 1988 | [JP] | Japan | 63-277648 |
| Apr. 28, 1989 | [JP] | Japan | 1-107742 |

[51] Int. Cl.⁶ ............................................. G02B 3/14
[52] U.S. Cl. ............... 428/34; 359/557; 359/831; 359/832; 359/837; 428/183; 428/335; 428/336; 428/412; 428/429; 428/430; 428/435; 428/447; 428/448

[58] Field of Search .................... 350/286, 287; 359/831, 837, 557, 832; 428/34, 183, 429, 430, 435, 412, 447, 448, 335, 336

[56] References Cited

U.S. PATENT DOCUMENTS

| 3,514,192 | 5/1970 | De La Ciesva | 350/286 |
| 4,198,254 | 4/1980 | Laroche et al. | 156/107 |
| 4,791,011 | 12/1988 | Mecca | 428/34 |

Primary Examiner—D. S. Nakarani
Attorney, Agent, or Firm—Fitzpatrick, Cella, Harper & Scinto

[57] ABSTRACT

In an optical element, an optically transparent substance is sandwiched between transparent paired plate-shaped elements by utilizing a connection member capable of deforming, and the angle formed by the paired plate-shaped elements is caused to vary by a force applied thereto from the outside, so that a predetermined optical characteristic for the passing light rays is obtained. The connection member is constructed from a high-molecular material capable of molding.

22 Claims, 27 Drawing Sheets

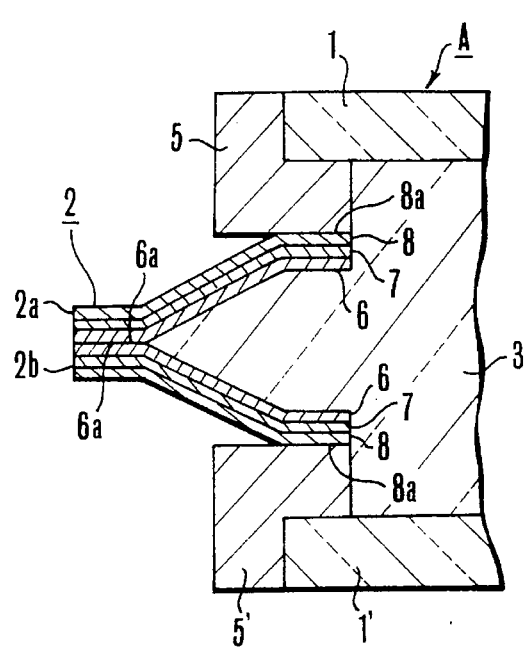
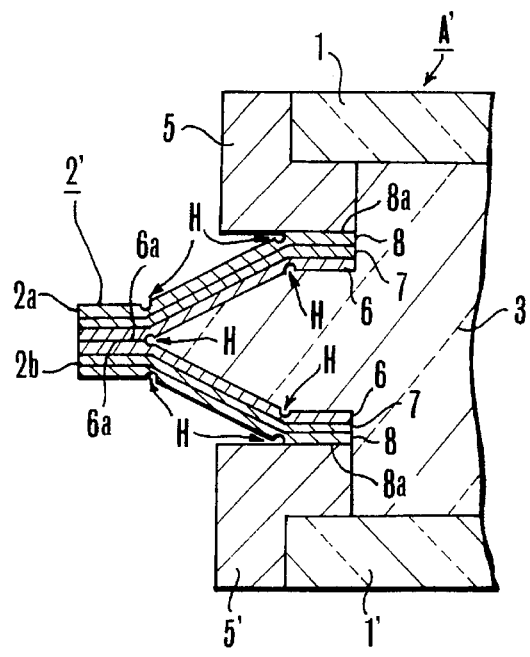
FIG.8A          FIG.8B
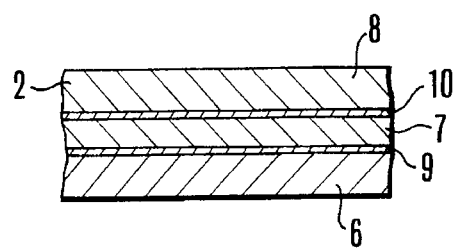
FIG.9

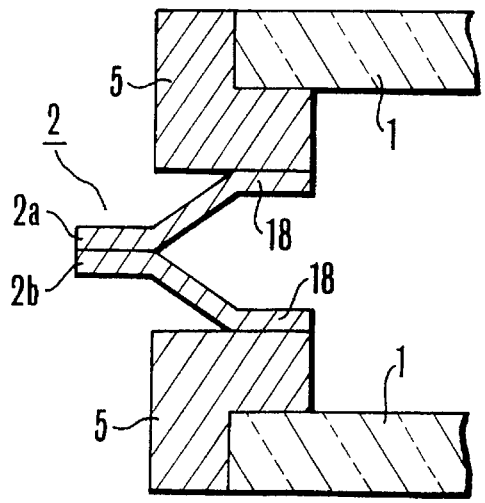
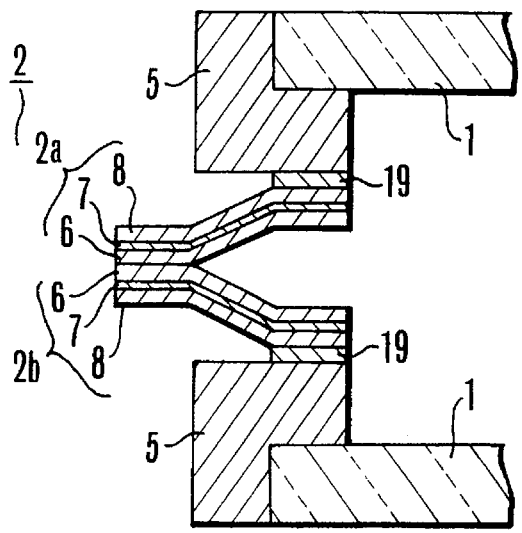
FIG.20  FIG.21
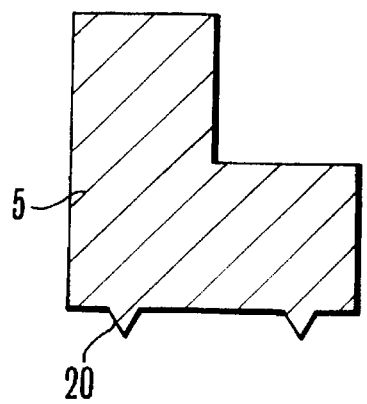
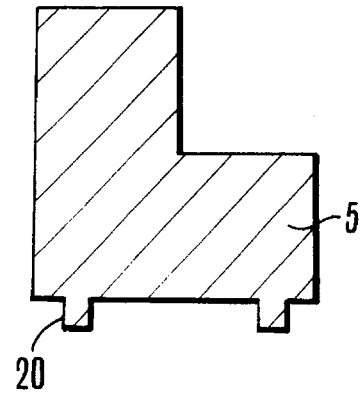
FIG.22  FIG.23

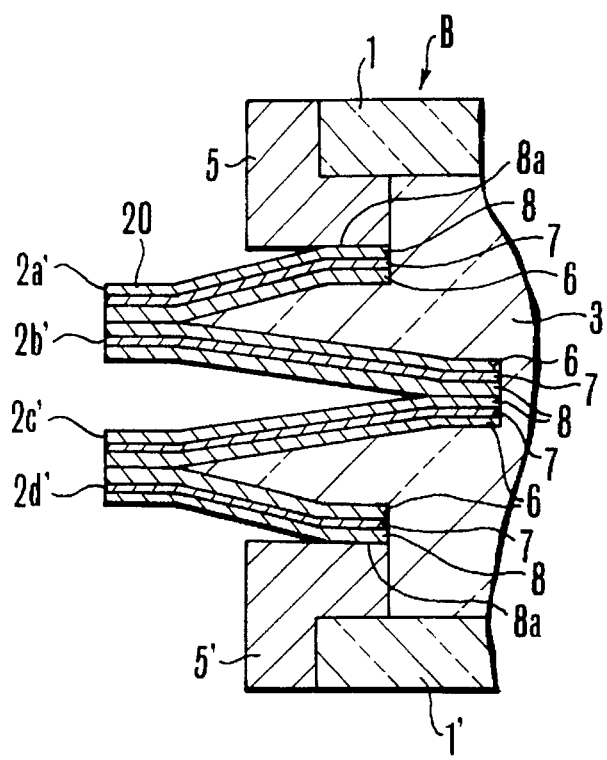
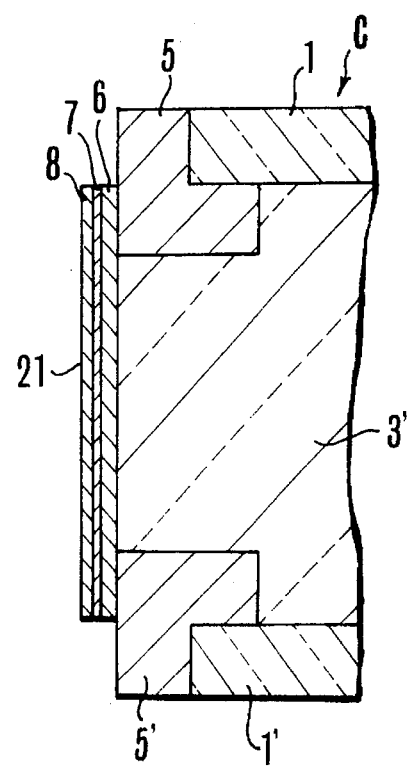
FIG.24  FIG.25
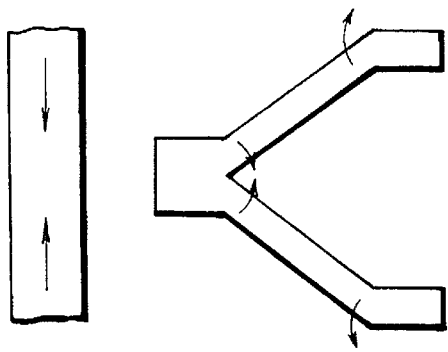
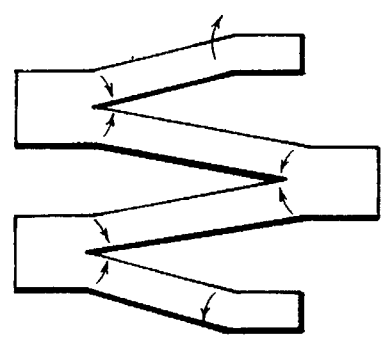
FIG.26  FIG.27  FIG.28

(OPTICAL ELEMENT C)

(OPTICAL ELEMENT A)

(OPTICAL ELEMENT B)

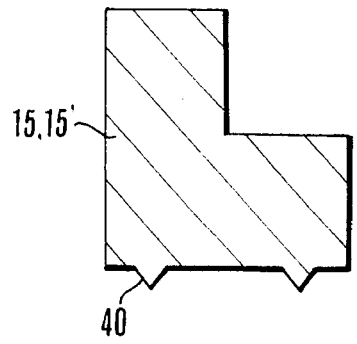
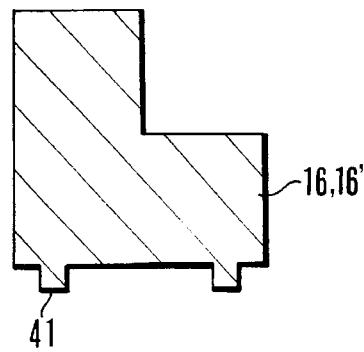
FIG.50A  FIG.50B
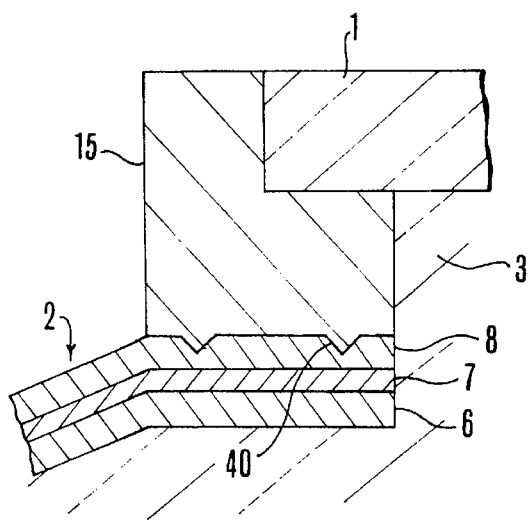
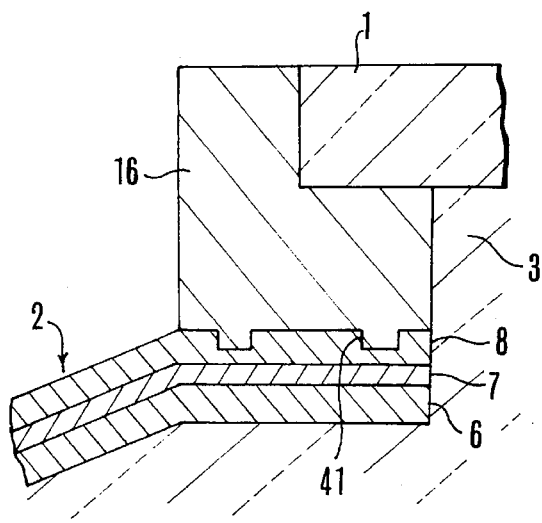
FIG.51A  FIG.51B

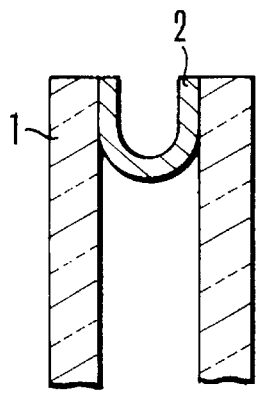 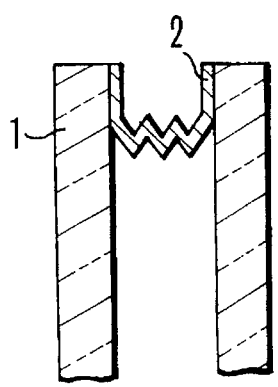 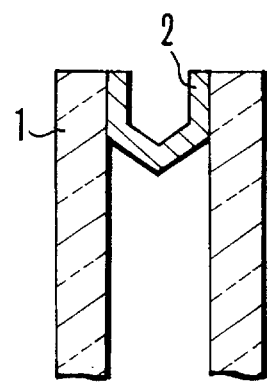
FIG.58  FIG.59  FIG.60
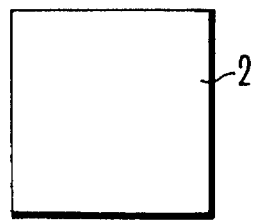 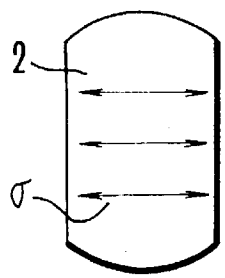 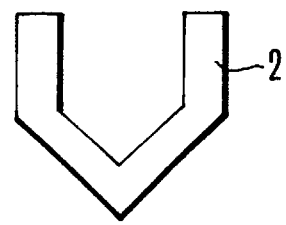
FIG.61  FIG.62  FIG.63
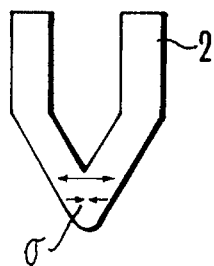 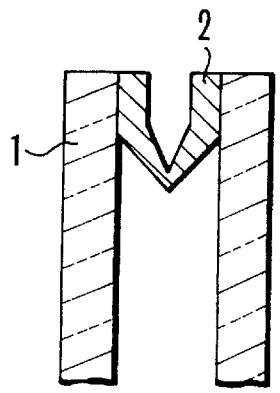 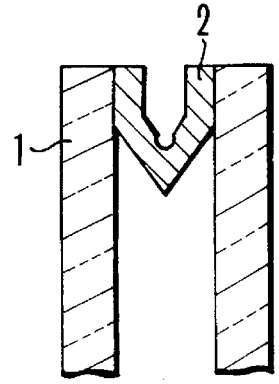
FIG.64  FIG.65  FIG.66

| FORM | | RELATIVE VALUE OF DRIVING POWER |
|---|---|---|
| V-SHAPE |  | Fy = −0.0551 |
| INVERTED V-SHAPE |  | Fy = −0.0574 |
| U-SHAPE |  | Fy = −0.0822 |

| | FORM | RELATIVE VALUE OF DRIVING POWER |
|---|---|---|
| SHORT ↑ |  | Fy = −0.142 |
| |  | Fy = −0.0493 |
| ↓ LONG |  | Fy = −0.0236 |

| | FORM | RELATIVE VALUE OF DRIVING POWER |
|---|---|---|
| THICK ↑ | ⌀30 → 0.5 1.5 ⌀31.5 → | $F_y = -0.142$ |
| | ⌀30 → 0.4 1.5 ⌀31.5 → | $F_y = -0.0715$ |
| | ⌀30 → 0.3 1.5 ⌀31.5 → | $F_y = -0.0290$ |
| ↓ THIN | ⌀30 → 0.2 1.5 ⌀31.5 → | $F_y = -0.0085$ |

FIG.73

VARIABLE-ANGLE OPTICAL DEVICE WITH OPTICALLY TRANSPARENT SUBSTANCE

This application is a continuation of prior application Ser. No. 07/429,613 filed Oct. 31, 1989 now abandoned.

BACKGROUND OF THE INVENTION

1. Field of the Invention

This invention relates to optical elements having a pair of transparent parallel flat plates with their intervening space having an optically transparent substance sealed therein, wherein the optical performance of a light beam passing through the plates is made to arbitrarily vary by varying the relative angle of one plate to the other plate. The invention also relates to a method of manufacturing the same and, more particularly to such an optical element which is suited to be used in a photographic system of, for example, a photographic camera, video camera, etc. as arranged in a portion of the photographic system to form an image stabilization optical system for compensating for the shake of an image due to the vibration of the photographic system.

2. Description of the Related Art

It has been known that an optically transparent substance, for example, liquid or silicone rubber, is sealed in between two transparent parallel flat plates to form a variable-angle prism body, and, as it is used as an optical element, when the angle (or the degree of parallelity) of one of the two plates to the other varies from outside control, a light beam passing through the plates provides a desired variation in optical performance. There have been many previous proposals for such an optical element.

FIG. 1 and FIG. 2 are schematic sectional views of an optical element of the sort proposed in, for example, Japanese Patent Publication No. Sho 41-11906. The optical element shown in these figures is constructed in such a way that two transparent parallel flat plates 201 are positioned in spaced surface-to-surface relation, a flexible member 202 for connection of these members encloses a space, and transparent liquid is sealed in this space. As a result, incident light rays h are made to deflect to a predetermined angle when emerging therefrom.

FIG. 3 and FIG. 4 are schematic views of another optical element which is proposed as an example of an embodiment in Japanese Laid-Open Patent Application No. Sho 60-176017. The optical element shown in these figures is constructed in such a way that two transparent parallel flat plates 221 are positioned in spaced surface-to-surface relation, and a transparent elastic body 224 is sandwiched between these plates. Further, similar to FIGS. 1 and 2, incident light rays h are made to deflect to a predetermined angle when emerging therefrom. Any of the conventional optical elements is operated in such a manner that a force from the outside is applied to vary the angle which one of the two flat plates makes with the other so that a variable angle prism whose vertex angle can be arbitrarily controlled is formed, permitting the incident light rays to emerge with a predetermined angle of deflection.

Since the connection member of the conventional optical element is, however, made of such a material and formed to such a shape that it expands or contracts when the angle which the two flat plates make with each other varies, the required driving power for this is generally large. For this reason, the drive source is necessarily of large size, and, as the number of repetitions of deformation increases, an accident such as break in the connection member is liable to occur.

Furthermore the substance sandwiched between the two parallel flat plates, as compressed, permeates through the connection member, or oozes out past the weld joint of the connection member with the parallel flat plates, and, particularly in the case of the transparent elastic substance, as it absorbs moisture in the air, its refractive index is caused to fluctuate.

Besides these, there is another problem in that the driving of the optical element accumulates stress at the joint of the connection member with the parallel flat plates, causing the joint to be peeled off and the interior substance to ooze out.

SUMMARY OF THE INVENTION

It is, therefore, an object of the present invention to provide an optical element, which is constructed in the form of a variable angle prism body, having optically transparent plates arranged in facing relation at each other and joined to each other through a connection member so as to create an internal space therebetween and having a transparent substance sealed in the internal space, where, for the substance of the connection member, appropriate properties are set forth so that the angle formed by the two plates can be easily varied by a small driving force and that the substance sealed in the internal space is prevented from changing as the condition of the external environment changes, thus assuring attainment and maintenance of an excellent optical performance.

Another object of the invention is to provide an optical element in which when joining the plates with the connection member, an appropriate way is set forth to assure good durability of the joint against repetitive deformation.

BRIEF DESCRIPTION OF THE DRAWINGS

FIG. 8A is a fragmentary sectional view in enlarged scale of the connection member 2 and its neighborhood of FIG. 6.

FIG. 8B is a fragmentary sectional view in enlarged scale of an example of variation of the first embodiment in the connection member 2' and its neighborhood.

FIG. 9 is a sectional view illustrating an example of a method of manufacturing the connection member 2.

FIG. 18, FIG. 19 and FIG. 20 are sectional views of the main parts of second, third and fourth embodiments of the invention respectively.

FIG. 21, FIG. 22 and FIG. 23 are sectional views of respective examples of improvement of a portion of the optical element of the invention.

FIG. 24 is a side sectional view illustrating the construction of another embodiment of the invention.

FIG. 25 is a side sectional view illustrating the construction of the prior known connection member.

FIG. 26 to FIG. 28 are diagrams to explain the directions in which the stress applies when the connection members of the conventional example and the aforesaid embodiments are deformed respectively.

FIG. 50A and FIG. 50B are side sectional views illustrating different examples of the form of a main part of the support member of other embodiments of the invention respectively.

FIG. 51A and 51B are side sectional views illustrating different examples of the form of a main part of the optical element of these embodiments.

FIG. 56, FIG. 57, FIG. 61 and FIG. 62 are sectional views and diagrams to explain the connection members in the conventional optical elements.

FIG. 58, FIG. 59, FIG. 60, FIG. 63, FIG. 64, FIG. 65 and FIG. 66 are schematic sectional views and schematic diagrams of connection portions usable in the optical elements of the invention.

FIG. 71 to FIG. 74 are tables to explain the simulation.

FIG. 75 is a sectional view in enlarged scale of part of FIG. 53.

FIG. 76 is a sectional view to explain a method of manufacturing the connection member of FIG. 53.

DETAILED DESCRIPTION OF THE PREFERRED EMBODIMENTS

To begin with, a first embodiment is described.

Figure 1:
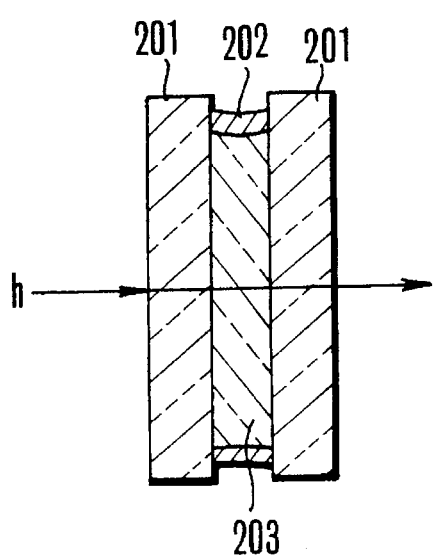
FIG. 1 to FIG. 4 are views to explain the conventional examples.
Figure 2:
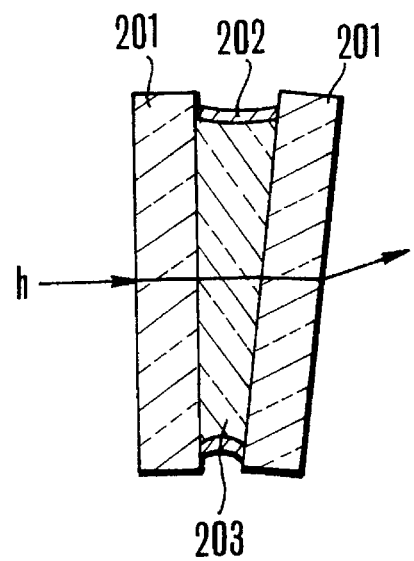
Figure 3:
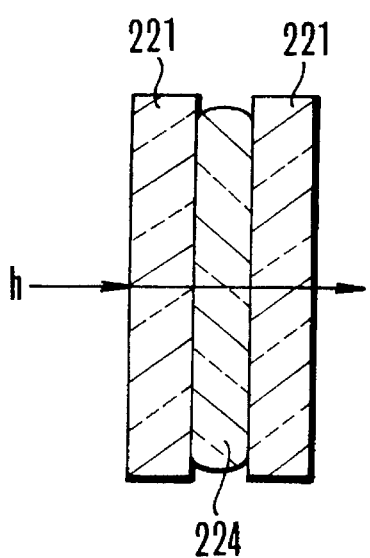
Figure 4:
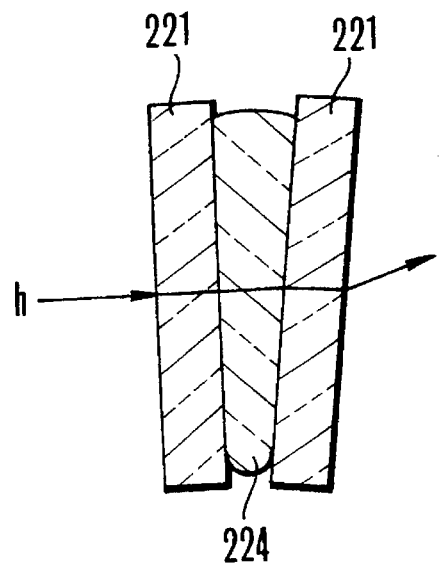
Figure 5:
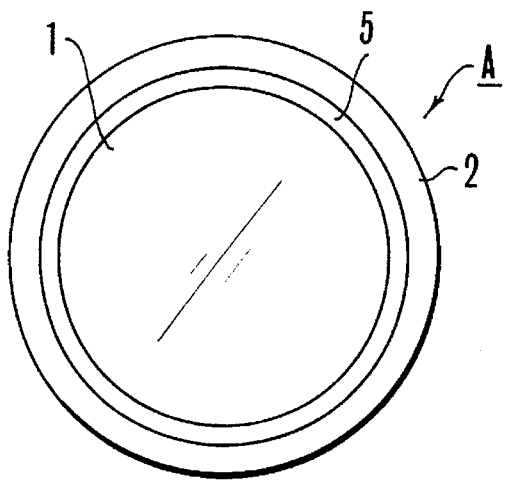
FIG. 5 is an elevation view illustrating the construction and arrangement of the main parts of a first embodiment of the invention.
Figure 6:
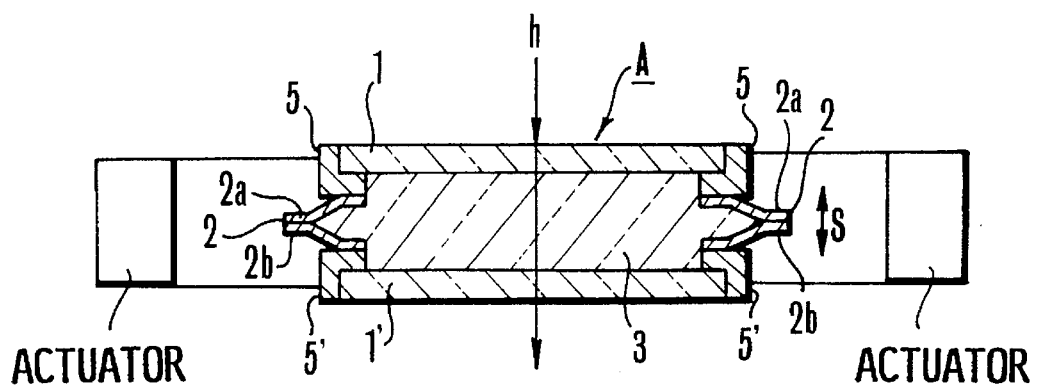
FIG. 6 is a cross-section view of FIG. 5.

FIG. 5 in elevation view shows the construction of the main parts of the first embodiment of the invention, and FIG. 6 is a side sectional view of FIG. 5.

In FIG. 5 and FIG. 6, "A" denotes an optical element of cylindrical shape of the first embodiment. This optical element A comprises a pair of optically transparent round parallel flat plates 1, 1' joined with an annular connection member 2 whose cross-section is formed to a letter "Y" shape, and an optically transparent substance 3 such as a liquid or silicones rubber, which is sealed in the space defined by the members 1, 1' and 3. In particular, it is formed by using a pair of annular support members 5, 5' of letter "L" shaped cross-section positioned between either of the parallel flat plates 1, 1' and the connection member 2 so as to support the parallel flat plates 1, 1'. Also, the optical element A is allowed to vary the angle (the degree of parallelity) of the two flat plates 1, 1' by a force applied from the outside thereto, thereby functioning as a variable angle prism body for arbitrarily varying optical performance with the light beam passing therethrough.

Further, each part of the optical element A is described in greater detail below.

The parallel flat plates 1, 1' are made of glass, plastic or like material, and, when there is no applied force from the outside, the angle formed by the two parallel flat plates 1, 1' is made nearly parallel as shown in FIG. 6. The connection member 2 is an elastic member of letter "Y" shaped cross-section, which is obtained by laminating ring-shaped components 2a and 2b that have ductility and flexibility and are made of polymeric film, aluminum foil, etc. to two layers, and is so formed as to expand or contract in directions indicated by a two-headed arrow S in FIG. 6. Further, the connection member 2 is so constructed as to have a portion in which the thickness and the length in the lateral direction of the components 2a and 2b (of letter "Y" shaped cross-section) are constant or different in parts and which is in alignment with an area of the outer peripheral surfaces of the parallel flat plates 1 and 1'.

Also, the substance 3 having a desired refractive index and an optically colorless transparency is of, for example, water, alcohol, glycol, silicone oil, modified silicone oil or silicone rubber. The support member 5, 5' is formed to a letter "L" shape in the cross-section, made of a material of high hardness, for example, plastic by molding techniques, and supports the parallel flat plate 1, 1' in such a way as to encompass the edge portion thereof. Further, it may be reinforced by an insert of aluminum, stainless steel or like metal material when molding, or another composite material which is obtained by combining another resin by dichroic molding techniques, or adhering means, for example, glass-contained polyester, may be used. If so, the rigidity of the support member 5 is desirably enhanced.

As the actuator, not only the screw or the cam, but also a piezoelectric element, electromagnet, ultrasonic motor, or even something that utilizes changes in the temperature, say, a shape-memory alloy, may be employed.

The operational principle of the first embodiment is explained below.

As shown in FIG. 6, when no external force is applied to the optical element A, the vertex angle that the two parallel flat plates 1 and 1' form is almost zero degrees, in other words, the degree of parallelity is maintained nearly parallel. In this state, the incident light rays h linearly travel across the optical element A, passing from the parallel flat plate 1 to the other one 1' from which it emerges.

Figure 7:
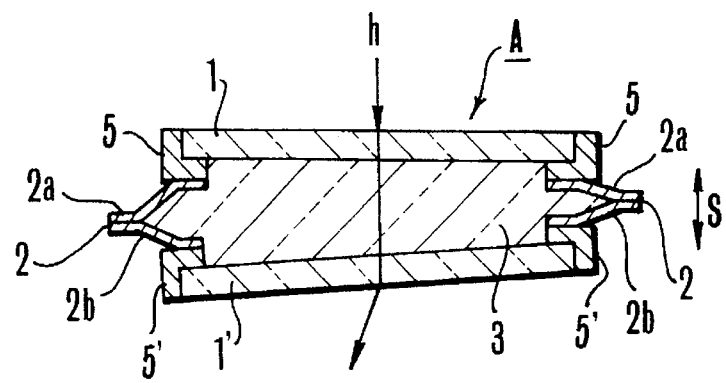
FIG. 7 schematically illustrates a variation of the optical element A with application of a force to a portion of the outer periphery thereof.

FIG. 7 schematically shows a case when a force is applied to a point on the outer periphery of the optical element A.

As shown in FIG. 7, when a external force is applied to the two parallel flat plates 1 and 1', the angle they make with each other varies as a function of the magnitude of the force. Hence, the optical element A gets a function like that of a variable angle prism body. For this reason, as shown in FIG. 7, the light rays h that enter through the optical element from the parallel flat plate 1 at right angles refract when passing through the other parallel flat plate 1', and emerge in deflection. During the application of the force, because the volume of the substance 3 (for example, liquid) remains unchanged, the left hand half of the components 2a and 2b of the connection member 2 expands in the directions of the arrow S, while the right hand half of the components 2a and 2b contracts in the directions of the arrow S as shown in FIG. 7. Thus, the whole optical element A deforms as a prism system.

For example, in a case where the optical element A is used in the imaging system of a photographic camera or video camera, the working force necessary to deform the substance (for example, liquid) is such that the resistance of the liquid can be almost ignored, so long as the speed of movement that exerts that force is not rapid. From this reason, in actual practice, the driving power that causes the optical element A to deform (the driving power for deformation) is determined by the stress-strain of the connection member 2.

Hence, according to the first embodiment, appropriate rules are set forth for the quality of material and the form of the connection member 2, thereby making it possible to curb the driving power for deformation of the optical element A to as small a value as possible.

FIG. 8A is a sectional view in enlarged scale of the connection member 2 of FIG. 6 and its neighboring part of the associated members therewith.

As shown in FIG. 8A, the connection member 2 is constructed from components 2a and 2b in the form of two sheets of high-molecular film each having a 3-layer structure. Each of the components 2a and 2b is a thin laminate consisting of three layers, namely, a film heat weld joint layer 6 for joining the sheets of high-molecular film with each other by thermal bonding, a barrier layer 7 for protecting the substance (liquid) from the moisture, etc. of the ambient atmosphere, and a mold heat weld joint layer 8 for joining with the mold or the support member 5 by thermal bonding.

To produce the connection member 2 of the first embodiment, two sheets of ring-shaped 3-layer components 2a and 2b are first superimposed one upon another with their film heat weld joint layers 6 inside. Their outer peripheral portions 6a, 6a are then joined with each other. Then, the mold heat weld joint layers 8, 8 which lie in the outer sides of the components 2a and 2b are joined at their inner peripheral portions 8a, 8a with the respective support members 5, 5'. With this structure, as shown in FIG. 7, a smaller angle of bending of the connection member 2 effects the equivalent change of the vertex angle of the optical element A. In such a manner, the driving power for deformation of the optical element A is decreased.

In the first embodiment, for the film heat weld joint layer 6, its material is preferably of such a quality that dissolving in, or swelling by, the substance (liquid) 3 does not take place, and that at the outer peripheral portion of the connection member 2, the sheets of its film can easily be joined by heat. As the material, use may be made of, for example, low density polyethylene, linear low density polyethylene, high density polyethylene, middle density polyethylene, polypropylene, polyamide, or polyester. These materials are preferable also since their heat weld joining method has already been established. Also, in a case where the substance 3 being sealed is liable to swell the high-molecular weight film, it is better to employ fluorine-contained high-molecular film which has strong solvent resistance such as polytetrafluoroethylene, polychlorotrifluoroethylene, polyfluorovinylidene, polyfluorovinyl, tetrafluoroethylene-hexafluoropropylene copolymer, ethylene-tetrafluoroethylene copolymer, or tetrafluoroethylene-perfluoroalkyl vinyl ether copolymer. The thickness of the film heat weld joint layer 6 is desirably about 5–100 μm. If its thickness is below 5 μm, the joining by thermal bonding will cause the film to more or less deform or get thinner due to the hot melting. By its influence, the weld joint fails to hold the desired strength. Also, if the thickness of the film is above 100 μm, the rigidity of the film becomes much too high, thereby increasing the driving power for deformation objectionably. Further, it is preferable that the thickness lies in a range of 20–60 μm.

The barrier layer 7 plays a role of preventing the substance (liquid) from absorbing moisture. As its material, aluminum foil is desirable because its vapor blocking and light shielding properties are perfect and moreover its price is cheap. Also, when the thickness of the aluminum foil is about 5–50 μm, a good result is attained. If the thickness is below 5 μm, pin holes will be formed during production of the aluminum foil and as the number of deformations of the connection member increases, thus diminishing the barriering property. If the thickness above 50 μm, the rigidity is so high that the driving power for the optical element will be increased objectionably.

Besides these, excellent moisture proof film of polychlorovinylidene, or polyvinyl alcohol, aluminum vacuum evaporated high-molecular film, or the aforesaid fluorine-contained film, or other metal foil may be used. Also, to increase the stick resistance and the pin hole proof, film of nylon or the like may be added to one layer between the barrier layer 7 and the weld joint layer 6 or 8.

Also, in a case where the adhesion of the barrier layer 7 with the weld joint layer 6 or 8 is not sufficiently high, if an intermediate layer of polyester or the like is added to between the barrier layer 7 and the film heat weld joint layer 6 or the mold heat weld joint layer 8, better results will be effected in that the adhesive strength increases, and in that the possibility of occurrence of delamination, due to the swelling by the liquid 3 and the repetitive bendings, decreases.

For the mold joint layer 8, it is desirable that its material be made of the same sort as that of the material of the support member 5, because the strength of the heat welded joint is very high. Therefore, the quality of material to be used is determined by the dimensional tolerances required for the support member 5. As such a material, use may be made of, for example, polyester, polyamide, polycarbonate, polypropylene, low density polyethylene, linear low density polyethylene, middle density polyethylene, high density polyethylene, polypropylene, or polychlorovinyl. Also, when its thickness is about 5 μm–100 μm, good results are attained. The reason for this is the same as that described in connection with the film heat weld joint layer 6. Particularly it is recommended to form it to a thickness of 20–60 μm.

For the film heat weld joint layer 6 and the mold heat weld joint layer 8 in the first embodiment, it is preferable to use non-stretched film manufactured by the casting method, or the extrusion method.

It is also desirable in the first embodiment that the overall thickness of the three layers constituting the connection member 2 be not more than 200 μm. On consideration of lowering the driving power for deformation, it is preferable to make it, if possible, fall in a range of from 10 μm to 100 μm.

As to the method of manufacturing the connection member 2, in a case where the barrier layer 7 is made of a polymer, the three layers all may be manufactured at once by using the extrusion method.

In another case where the barrier layer 7 is made of aluminum foil or previously stretched plastic film, the dry laminate method using adhesive agent coatings 9 and 10 as shown in FIG. 9, or the extrusion laminate method using molten polyethylene as the adhesive agent may be used. Even in this case, a good adhesive force is obtained. Here, FIG. 9 shows an example of the manufacturing method for the connection member 2.

Besides this, the connection member 2 can be manufactured by using general purpose package film of such structure as, for example, polyester/aluminum/high density polyethylene, polyester/nylon/low density polyethylene, polyester/aluminum/polypropylene, polyamide/aluminum/high density polyethylene, polyester/polyvinyl alcohol/polypropylene, polyamide/aluminum/polypropylene, linear low density polyethylene/polyester/aluminum/polyester/linear low density polyethylene, vacuum evaporated aluminum linear low density polyethylene/polyester/vacuum evaporated linear low density polyethylene, vacuum evaporated aluminum linear low density polyethylene/polyester/vacuum evaporated aluminum linear low density polyethylene, vacuum evaporated aluminum linear low density polyethylene/vacuum evaporated aluminum polyester/vacuum evaporated aluminum linear low density polyethylene, vacuum evaporated aluminum linear low density polyethylene/vacuum evaporated aluminum polyester/linear low density polyethylene, linear low density polyethylene/fluoride-contained film/linear low density polyethylene, linear low density polyethylene/polychlorovinylidene/linear low density polyethylene, linear low density polyethylene/polyvinyl alcohol/linear low density polyethylene, or linear low density polyethylene/nylon/polyvinyl alcohol/linear low density polyethylene.

Here, an example of a modification of the connection member 2 used in the first embodiment is described.

FIG. 8B is a fragmentary sectional view in enlarged scale of a connection member 2' and its neighboring parts of the associated members therewith according to the example of a modification of the first embodiment.

An optical element A' of this example of modification is similar in the overall construction to the optical element A, but different in that a number of holes (in the drawing, indicated by arrows H) for dispersing the stress concentration are provided in the place at which the stress is applied when the connection member 2' expands or contracts. The details of the position of stress and others will be described later. Yet the use of such holes further assists in promoting the reduction of the deformation stress of the connection member which is attained by using the letter "Y" shaped cross-section. Also, to make the holes H in the film, the prior known techniques such as that of melting by heating can adequately cover.

Next, using FIG. 10 to FIG. 16, a practical example of the process of manufacturing the optical element using the connection member 2 according to the present embodiment is described.

Figures 10, 11:
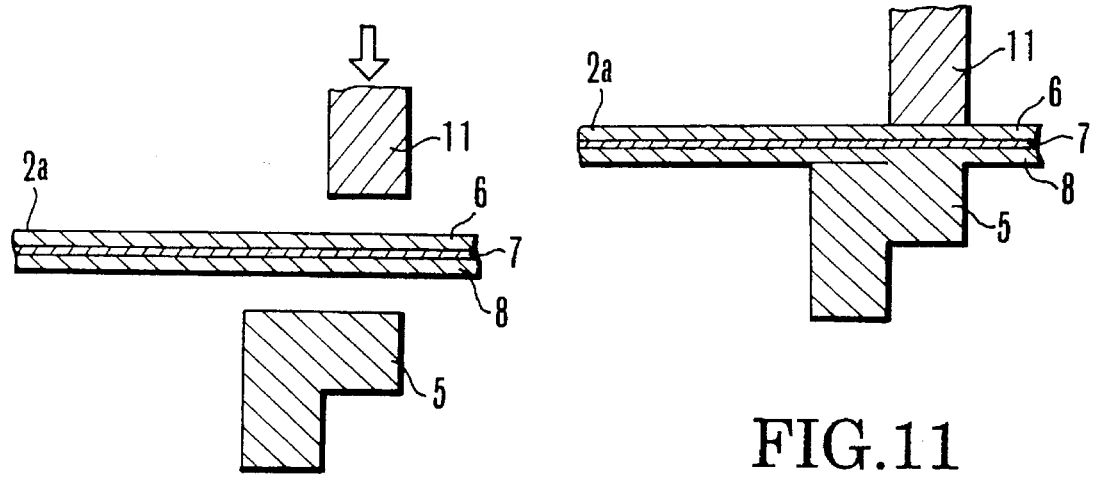
FIG. 10 to FIG. 16 are schematic sectional views of the main parts in the various steps of a process for producing the optical element of the invention.

At first, the support member 5, which is made of plastic, is prepared after it has been molded or machined to high precision accuracy. Then, as shown in FIG. 10, on that surface of the support member 5 that is to be joined, the laminated film consisting of the film heat weld joint layer 6, the barrier layer 7 and the mold heat weld joint layer 8, which film is to constitute the component 2a of the connection member 2, is positioned so that the exposed surface of the mold heat weld joint layer 8 of the same material as that of the support member 5 confronts with it. Further, a heat joining device 11 is laid above it, and then brought into contact with it under pressure as shown in FIG. 11. Upon heating, they adhere to each other. Here, as the heat joining device 11, use may be made of the heat press device using a heating metal tool of high thermal conductivity made of aluminum, copper, brass, etc. an impulse seal device utilizing the instantaneous heat generated by a current supply, an ultrasonic welder device utilizing minute vibrations and pressure, or a heating device using high frequency inductance. In the present embodiment, by taking into account the used material, the form, mass production, cost, and others, an optimum one is employed.

Figures 12, 13:
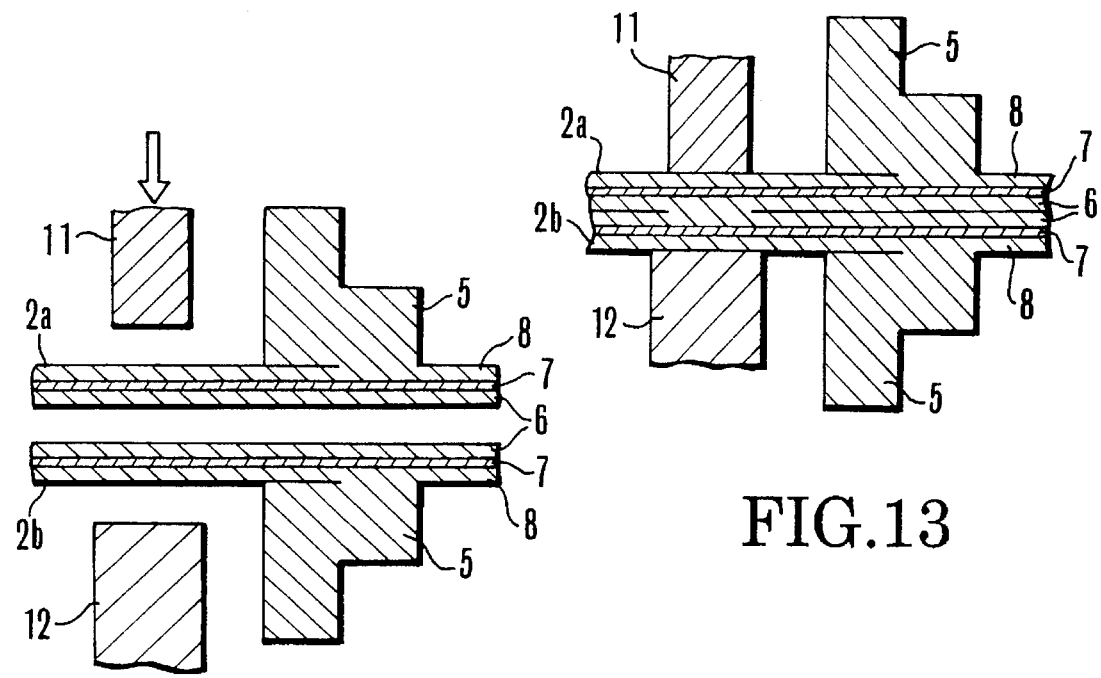
Figure 14:
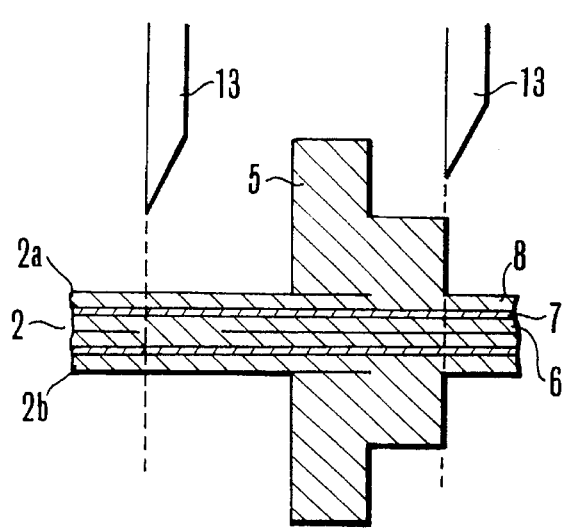
Figure 15:
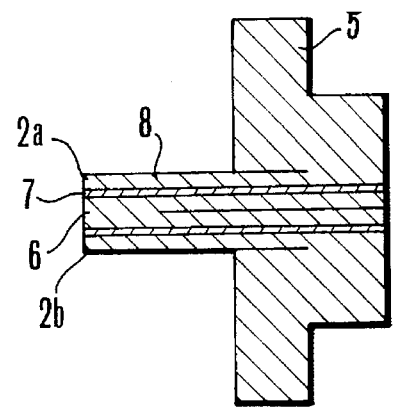
Figure 16:
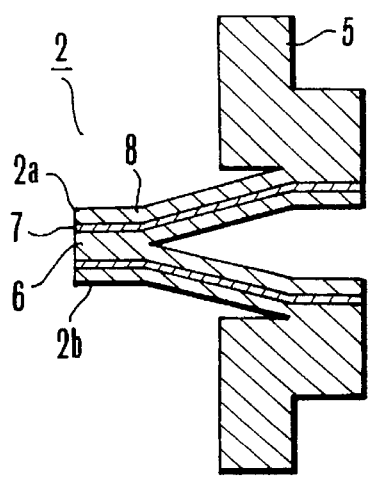

Next, the intermediate part obtained from the step shown in FIG. 11 is prepared two in number. They are laid in such an orientation that the exposed surfaces of their film heat weld joint layer 6 confront with each other as shown in FIG. 12. Further, the heat joining device 11 and a retainer 12 are arranged in alignment with each other on the outer sides of the support members 5. Then, the two components 2a and 2b each consisting of the laminated film are welded by heating to adhere with each other in a portion of the film heat weld joint layer 6, as shown in FIG. 13. Here, the retainer 12 is used as a support base for assisting in applying the pressure of the heat joining device 11, which is constructed from a tool made by applying or laminating an over-coating of rubber or Teflon on metal, to the film with high efficiency and without unevenness. Next, a cutter 13 for severing both ends of the connection member 2 is prepared as shown in FIG. 14. By cutting at the portions shown by the dashed lines, the connection member 2 is finished as shown in FIG. 15. Here, as the cutter 13, the shearing cutter which is utilized in punching of the press, a punching blade made of steel, or any other type of cutting tool can be used. Next, the two components 2a and 2b are vertically spaced apart as shown in FIG. 16, and then locating is carried out. Finally, the support members 5 are assembled with the parallel flat plates 1 while simultaneously filling the internal space with the substance (liquid) 3. Thus, the optical element is obtained.

Figure 17:
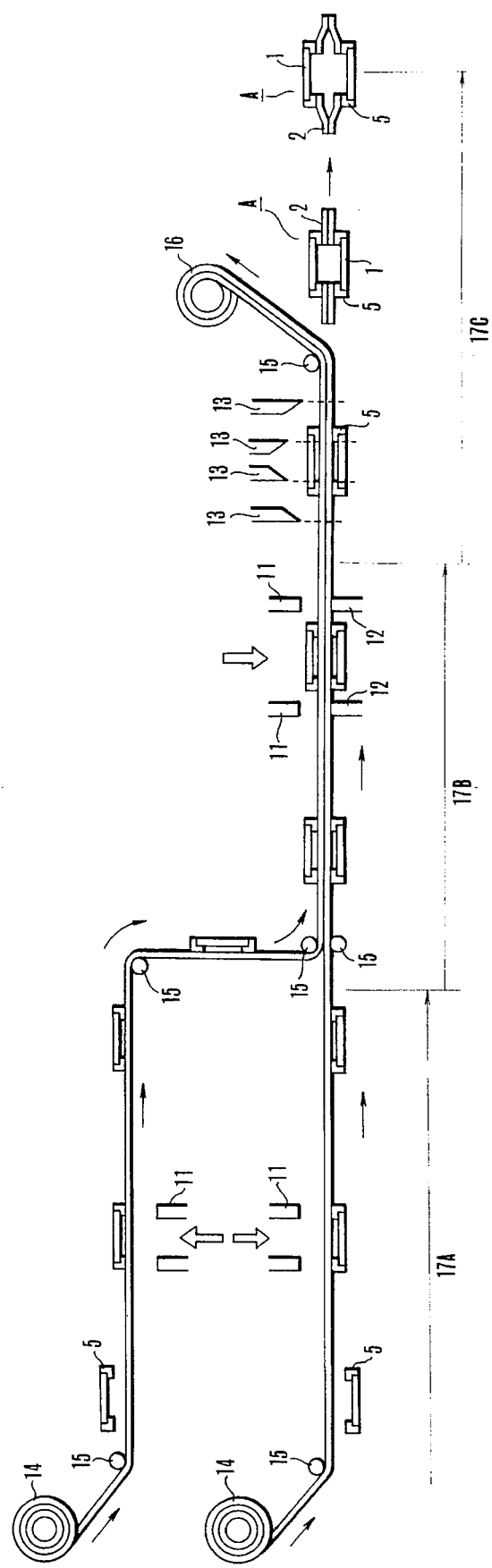
FIG. 17 is a schematic diagram of the main parts illustrating a series of assembly lines in the various steps of a process for manufacturing the optical element of the invention.

FIG. 17 schematically shows the main parts of a practical example of a mass production apparatus with a series of assembly lines displaying each operation of the aforesaid manufacturing method shown in FIG. 10 to FIG. 16.

In the same figure, reference numeral 14 denotes a take-up portion, where the laminated film (component 2a, 2b) for use in the connection member 2 is taken up in the form of a roll, corresponding to the start point of the mass production apparatus.

A pinch roller (or auxiliary roller) 15, when rotating, feeds the laminated film and changes the direction of its transportation. The steps of the process which are shown in FIG. 10 and FIG. 11 correspond to a first assembly line 17A of FIG. 17. This line is two in number, on each of which the support member 5 is joined with the laminated film by heating.

The steps of FIG. 12 and FIG. 13 correspond to a second assembly line 17B of FIG. 17, on which the two sheets of the laminated film carrying the respective support members 5, joined therewith by heating, are combined to one sheet and joined to each other by heating.

The steps of FIG. 14, FIG. 15 and FIG. 16 correspond to a third assembly line 17C of FIG. 17, on which the connection member 2 of the sheets of the laminated film, joined with each other by heating, is cut out at both ends thereof, while the unnecessary portion of the laminated film is taken up on a take-up portion 16. The framework for the optical element A is then transferred to a conveyer or the like. After, the parallel flat plates 1 are joined with the framework, and the substance (liquid) 3 is poured into, and sealed in, the internal space.

It will be appreciated from the foregoing that, in the present embodiment, when the two sheets of the laminated film are joined with each other, they are welded by heating. The use of such a step in the process allows the support member to run on the conveyer or rollers, making it easy to automate the assembly line. Thus, a large reduction of the difficulty of the assembling operations and a simplification of the equipment for manufacturing have been achieved.

Figure 18:
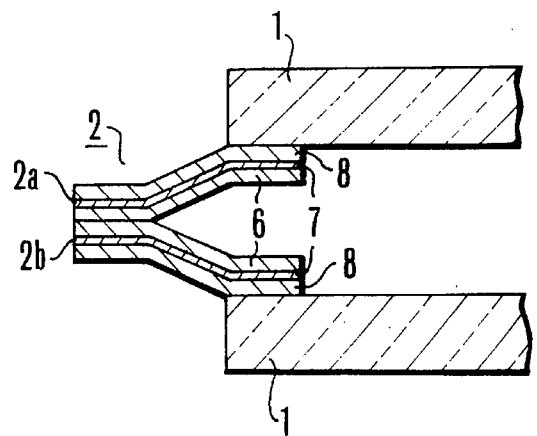

FIG. 18 is a sectional view in enlarged scale of part of a second practical example of the connection member 2 of the invention.

In this example, a polycarbonate or like transparent plastic material is used in the parallel flat plate 1, and the same material is used in the laminated film (for the components 2a and 2b).

That is, the mold heat weld joint layer 8 of the laminated film (the component 2a, 2b) is made of the same material, for example, polycarbonate film, so the support member 5 is omitted and it is directly joined with the parallel flat plate 1.

In this case, the number of parts of the optical element can be reduced, thereby giving advantages that the efficiency of the assembly line is improved and its complexity is reduced.

Figure 19:
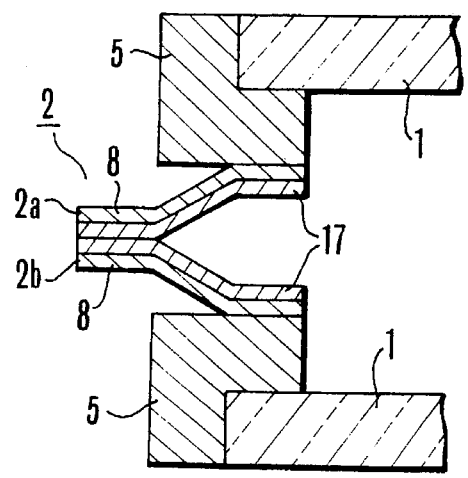

FIG. 19 is a sectional view in enlarged scale of part of a third practical example of the connection member 2 of the invention.

In this example, the fluorine-contained film or like film, which provides a high barrier against water vapor and is capable of joining by welding, is used in a film 17 as the combination of the film heat weld joint layer 6 and the barrier layer 7, which are shown in FIG. 18. Thus, the connection member 2 is constructed as a whole to a 2-layer structure. The use of such a 2-layer structure simplifies the entirety of the optical element.

FIG. 20 is a sectional view in enlarged scale of part of a fourth practical example of the connection member 2 of the invention. In this example, the component 2a (2b) constituting part of the connection member 2 is constructed from a sheet of single-layer high-molecular film. As the material of the single-layer high-molecular film in this example, polyester, polyamide, or polycarbonate can be used.

By this example, it becomes possible to achieve a simplification of the optical element A.

It should be noted in connection with each of the above-described practical examples that in a case where the support member 5 has the reference surface for the accuracy of the position control of the optical element and a high precision accuracy is required, the support member 5 may be made of metal. If so, the usable joining method is, for example, as shown in FIG. 21, by introducing a new means such as a hot melt film 19 capable of joining with different sorts of material in between the mold heat weld joint layer 8 and the metallic support member 5 for the joining purpose.

Instead of using heat in joining, it is also good to use a coating of liquid adhesive agent at 19 for the joining purpose. In this case, an advantage is produced in that the accuracy of the position of the optical element is increased.

Beside this, it is to be noted that the plastic support member 5, which is used in the example of FIG. 18, is preferably provided with an energy director 20 in the form of one to three conic or cylindrical protuberances on the one of its surfaces that is to join with the connection member 2, as shown in FIG. 22 or FIG. 23. With this, when heating to weld, the pressure is concentrated to avoid occurrence of uneven distribution of the pressure, or like accident, thus permitting the joining operation to be carried out with increased reliability. This produces an advantage of improving the fidelity of the optical element.

Next, another embodiment is described.

FIG. 24 is a side sectional view illustrating the construction of another embodiment of the invention. In the figure, reference symbol B denotes an optical element of the present embodiment.

From the above-described first embodiment, it is different in that as shown in FIG. 24, two members, each of which is similar to the connection member 2 of letter "Y" shaped cross-section are coupled with each other in a 2-fold structure to form a connection member 20 of letter "W" shaped cross-section. This connection member 20 comprises four elastic components $2a'$, $2b'$, $2c'$ and $2d'$ of 3-layer structure, which is similar to the above-described elastic components $2a$, $2b$ in that the film heat weld joint layer 6, the barrier layer 7 and the mold heat weld joint layer 8 are laminated one upon another, but different in that the elastic components $2b'$ and $2c'$ are joined with each other at their mold heat weld joint layers 8, 8. Again, similar to the above-described connection member 2, the connection member 20 has its mold heat weld joint layers 8, 8, which are exposed to the outer side joined at their inner peripheral portions $8a$, $8a$ with the respective support members 5, 5'. The transparent substance 3 is then sealed in the interior of the framework of such construction for the optical element B, likewise for the optical element A.

In such a manner, like the connection member 20, it is also possible to use two connection members of the letter "Y" shaped cross-section. Again, if the optical element has a necessary rigidity, the three connection members of letter "Y" shaped cross-section may be coupled with each other.

Next, taking the above-described first and present embodiments together with the conventional example, the difference of the deformation stress due to the difference of the form of the connection member of the optical element will be described.

FIG. 25 is a side sectional view illustrating the construction of the conventional connection member. FIG. 26 to FIG. 28 are diagrams to explain the direction in which stress is exerted when the conventional example and the first and present embodiments deform respectively.

In FIG. 25, reference character C denotes one of the conventional examples of the optical element. A connection member 21, made of flexible material such as plastic and formed to the letter "I" shape in cross-section, is joined by heating with the ring-shaped support members 5, 5' at the peripheral edges. When a force is applied to a portion of this conventional connection member 21 so that a contraction deformation occurs, the deformation stress that is exerted at this time becomes large because the entirety of the connection member 21 has, as shown in FIG. 26, to contract in the direction indicated by the arrows. In the case of the connection member 2 formed to the letter "Y" shape in cross-section as shown in FIG. 8A, on the other hand, the driving power for deformation by the applied force is, as shown in FIG. 27 not more than that necessary to deform only to slight bendings. Hence, it becomes very small. That is, the deformation stress G that applies at this time is dispersed as shown by the arrows of FIG. 27, and the areas to which the respective stresses apply become very minute. Therefore, the driving power for deformation becomes far smaller than in the case of FIG. 26.

Besides this, if the connection member 20 having the two letter "Y"-shaped connection members is used as shown in FIG. 24, the strain, that is, stress exerted at each bent portion at the time of deformation by the applied force is more dispersed as shown in FIG. 28 than in the case of FIG. 27, while each getting smaller. By this, the driving power for deformation becomes smaller. Further, if a form having three or more connection members of the letter "Y" shape in cross-section is employed, the driving power for deformation becomes even smaller. This is good.

Here, taking the above-described connection members 21, 2 and 20 as samples, the concrete force Fy required for the driving power for deformation is explained in connection with the measurement results.

Figure 29:
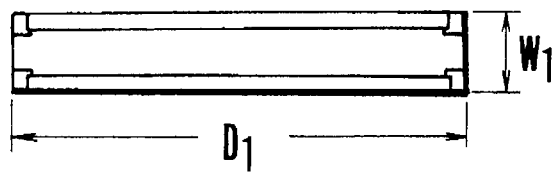
FIG. 29 to FIG. 31 are schematic sectional views of different examples of the connection member of the optical element respectively.
Figure 30:
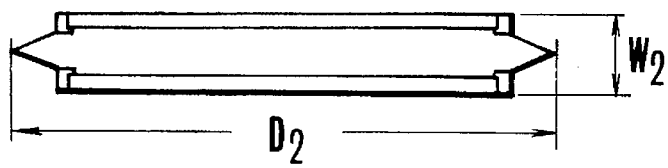
Figure 31:
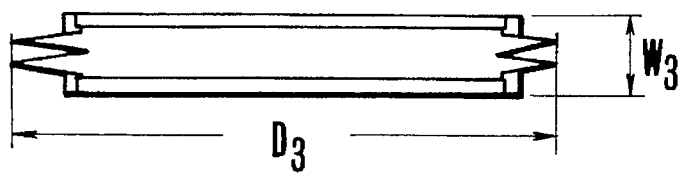

FIG. 29 to FIG. 31 are schematic diagrams of the optical elements whose connection members differ in shape from each other. In FIG. 29 there is shown the optical element C of the type shown in FIG. 25. In FIG. 30, there is shown the optical element A of the type shown in FIG. 8A. In FIG. 31, there is shown the optical element B of the type shown in FIG. 24. In these figures, $W_1$ to $W_3$ represent the widths of the individual optical elements, and $D_1$ to $D_3$ represent the diameters of the individual optical elements. It is to be noted that the parameters used at the time of measurement are set to $W_1$, $W_2$, $W_3=10$ mm, $D_1=\Phi 64$ mm, $D_2$, $D_3=\Phi 74$ mm. Also, the connection members 2, 20 and 21 each are made by using 3-layer 70 μm thick film (meaning the elastic component) of PE (polyethylene)/EvOH (ethylene-vinyl alcohol copolymer)/PE and are joined by heating with the support members 5, 5' made of LLDPE (linear low density polyethylene) and having a diameter of 64 mm.

Figure 32:
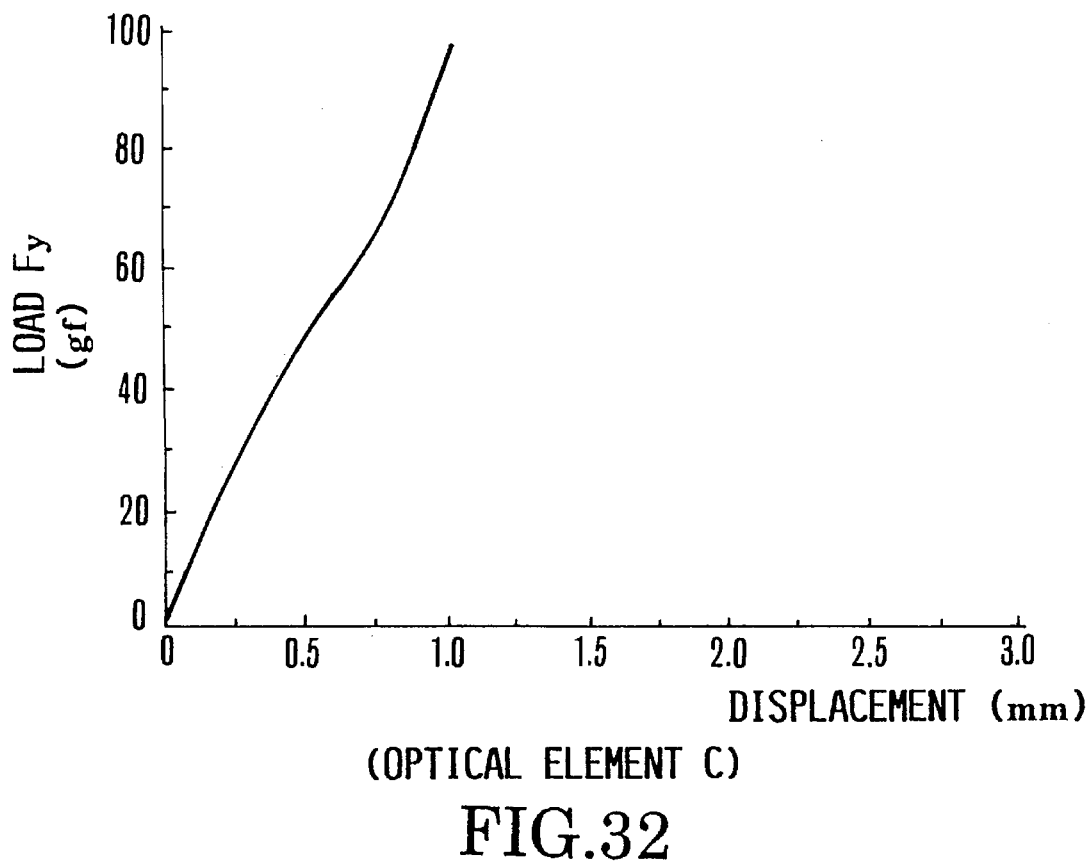
FIG. 32 to FIG. 34 are graphs illustrating the relationship between the load and the displacement as derived by averaging the measured values of the required load Fy for deformation driving on seven samples in each of the types of optical elements C, A and B.
Figure 33:
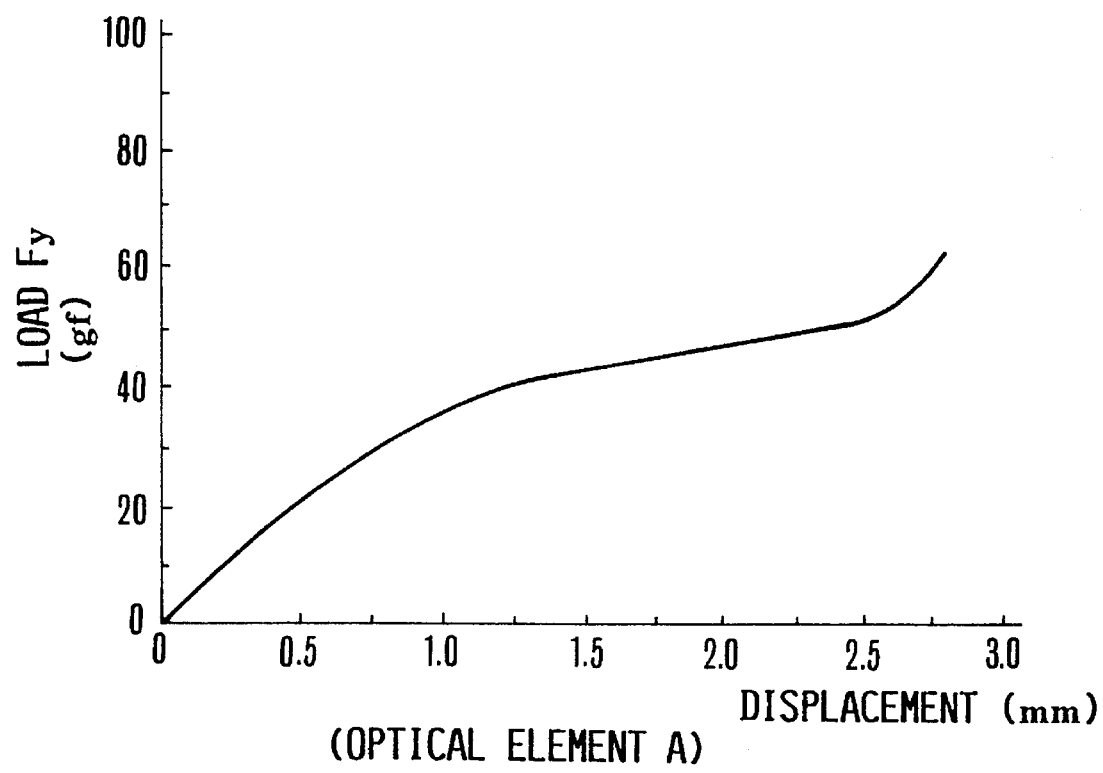
Figure 34:
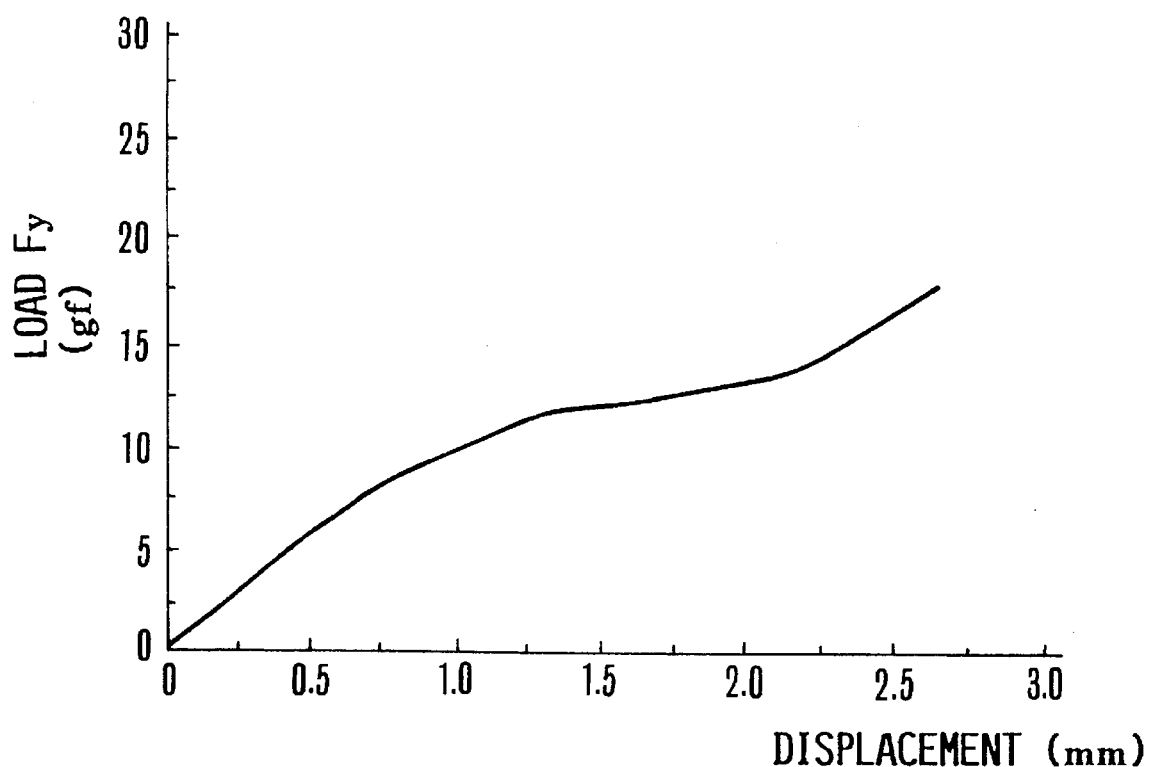

FIG. 32 to FIG. 34 are graphs illustrating the relationship between the load and and the displacement based on the average value as the load Fy, which is necessary to the driving power for deformation, is measured on seven samples in each of the types of the optical elements C, A, B. In each graph, the load is expressed by gram force (gf) and the displacement by millimeter (m m). Using these FIG. 32 to FIG. 34, the measured average values for the same depressed amount are compared with each other and it is found that while the type of the optical element C has Fy=57(gf), for the type of optical element C, it is 73% decreased to Fy=13 (gf), and for the type of the optical element B, it is 89% decreased to Fy=6 (gf). In the connection members 2, 20 and 21, a result is obtained that the larger the number of connection members of letter "Y" shape in cross-section, the smaller the driving power for deformation becomes.

It will be appreciated that according to the present embodiment, the driving power for deformation can be suppressed to a smaller value by increasing the number of connection members of letter "Y" shape in cross-section.

Next, a method of manufacturing the optical element is described, taking an example of the connection member 20 according to the present embodiment.

FIG. 35 through FIG. 45 are taken to explain a process for producing the optical element B of the embodiment shown in FIG. 24.

Figure 35:
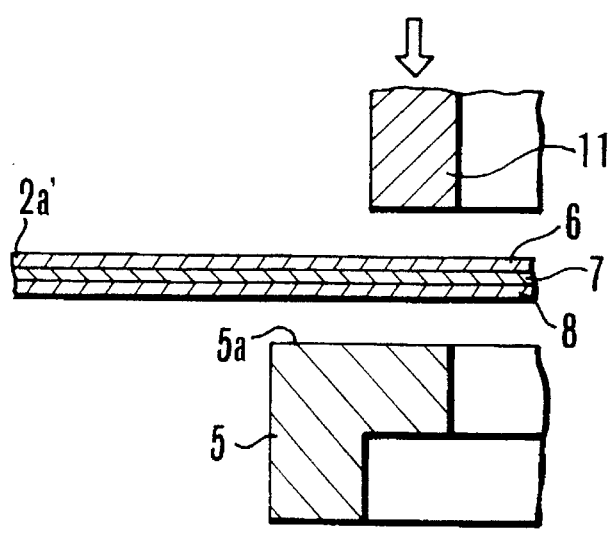
FIG. 35 to FIG. 45 are sectional views to explain a method of manufacturing the optical element B.
Figure 36:
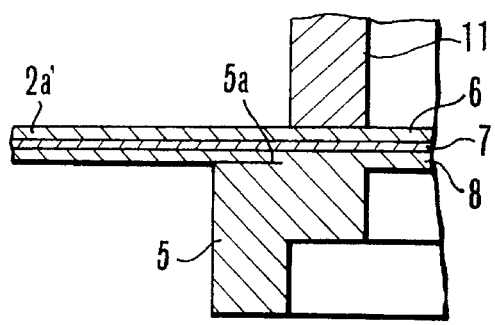

At first, an annular support member 5 of letter "L" shape in cross-section, which has previously been molded or machined to high precision accuracy, is prepared and then a non-formed component 2a' (a sheet of 3-layer laminated film comprising the film heat weld joint layer 6, the barrier layer 7 and the mold heat weld joint layer 8), which is to constitute the connection member 2, is arranged on the joint surface 5a of the support member 5 as shown in FIG. 35. At this time, the elastic component 2a' is oriented so that its mold heat weld joint layer 8 of the same material as that of the support member 5 confronts with the latter. Further, a heat joining device 11 of cylindrical shape, which has so far been arranged above it, is moved in a direction indicated by the arrow of FIG. 35 and then a portion of the joint surface 5a of the support member 5 and the mold heat weld joint layer 8 are brought into contact under pressure and heated in a ring shape to join with each other as shown in FIG. 36. Here, as the heat joining device 11, use may be made of the heat press device using a heating metal tool of high thermal conductivity made of aluminum, copper, brass, etc., the impulse seal device utilizing the instantaneous heat generator by current supply, the ultrasonic welder device utilizing minute vibrations and pressure, or the heating device by high frequency wave induction. Within the spirit of the invention, an optimum one is used by taking into account the used material, the form, mass production and cost.

Figures 37, 38:
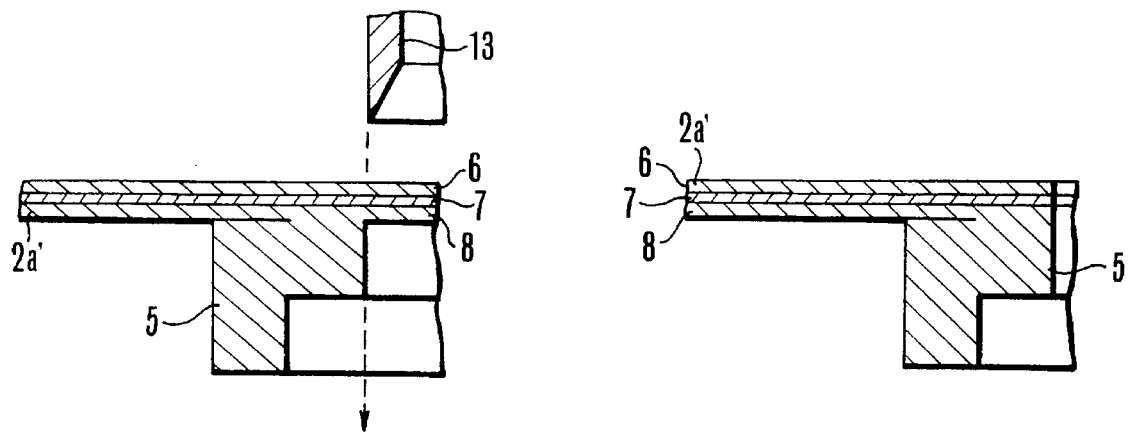

Next, to cut the inner side of the elastic component 2a', a cutter 13 of cylindrical shape is prepared above it as shown in FIG. 37. The cutting of the elastic component 2a' is carried out along the direction indicated by the dashed line. As a result, the inner peripheral edge of the elastic component 2a' and the inner peripheral wall of the support member 5 are finished so as to coincide with each other as shown in FIG. 38. Here, as the cutter 13, the shearing cutter which is utilized in punching of the press, or a punching blade made of steel material, or any other type of cutting tool can be used.

Figure 39:
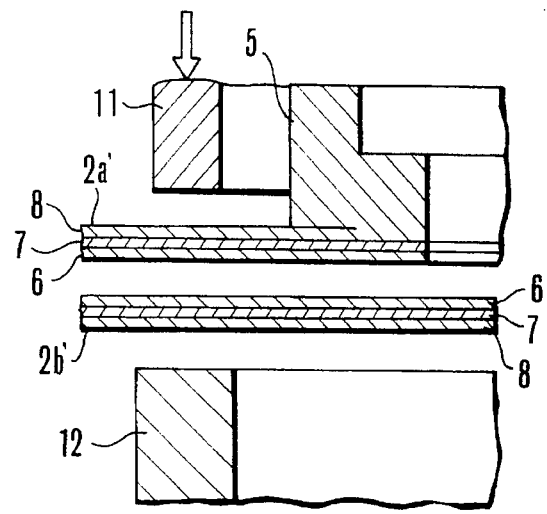
Figure 40:
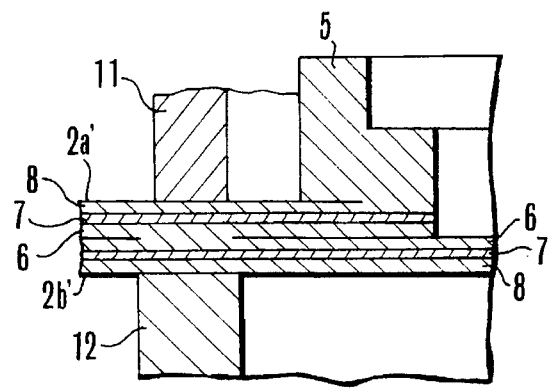

Next, the intermediate part obtained in the step shown in FIG. 38 and the outer surface of the film heat weld joint layer 8 of the elastic member 2b' are arranged in confronting relation as shown in FIG. 39. Further, the heat joining device 11 and a retainer 12 of tubular shape are brought into alignment with each other, and arranged so as to take their places on the outer side of the outer peripheral wall of the support member 5. Then, two components 2a' and 2b' of the laminated film are put with their film heat weld joint layers 6, 6 in contact with each other and joined in a portion that is sandwiched between the heat joining device 11 and the tubular retainer 12 by heating, as shown in FIG. 40. Here, the retainer 12 is constructed from a tool having an overcoating of rubber or teflon, etc. applied or laminated on metal, and is used as a support base for applying the pressure of the heat joining device 11 to the film with high efficiency and without unevenness.

Next, the intermediate part obtained in the step shown in FIG. 40 is prepared two in number. One of them is the intermediate part attributable to the support member 5 and the elastic components 2a' and 2b' produced in the above-described steps of FIG. 35 up to FIG. 40, and the other, though not shown, is the intermediate part attributable to the support member 5' and the elastic components 2c' and 2d'.

Figure 41:
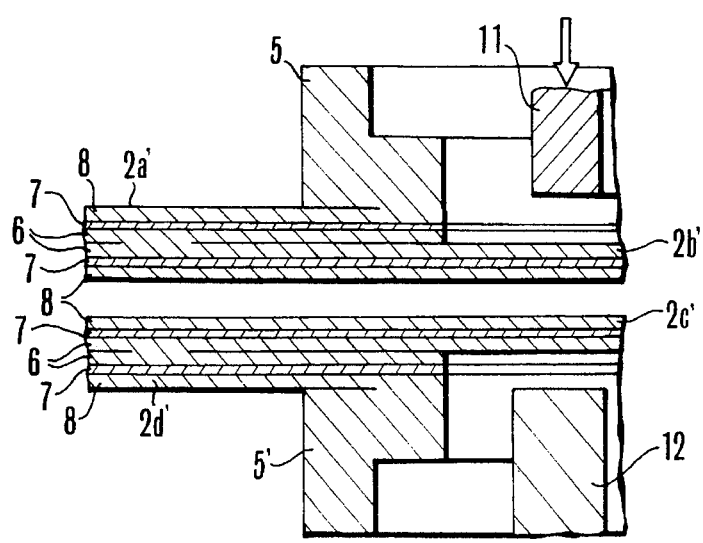

Next, the above-described two intermediate parts are arranged in such an orientation that the mold heat weld joint layers 8, 8 of the elastic components 2b' and 2c' confront with each other, as shown in FIG. 41. Further, the heat joining device 11 and the retainer 12 are put on the inner side of the inner peripheral wall of the support member 5. Then, the two components 2b' and 2c' of the laminated film are joined by thermal bonding in a portion of the mold heat weld joint layers 8, 8 (that portion which is sandwiched between the heat joining device 11 and the retainer 12), as shown in FIG. 42.

Figure 42:
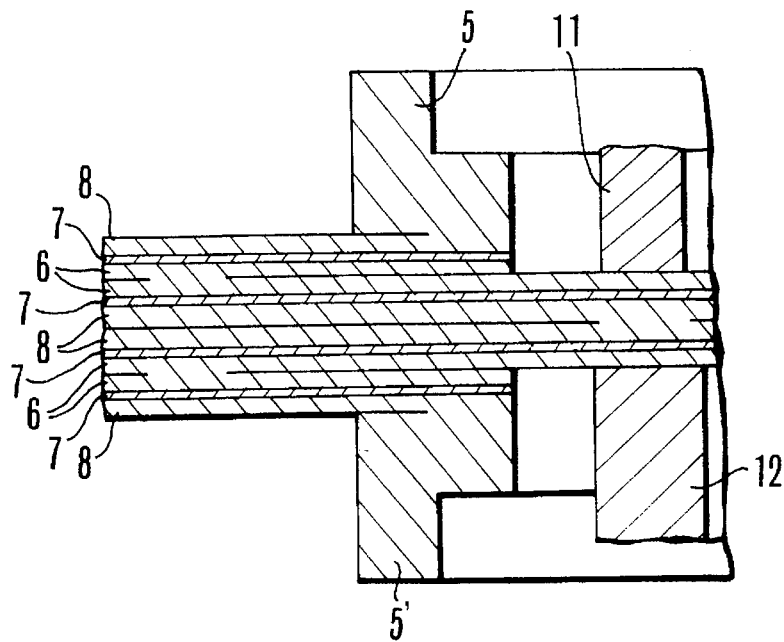
Figure 43:
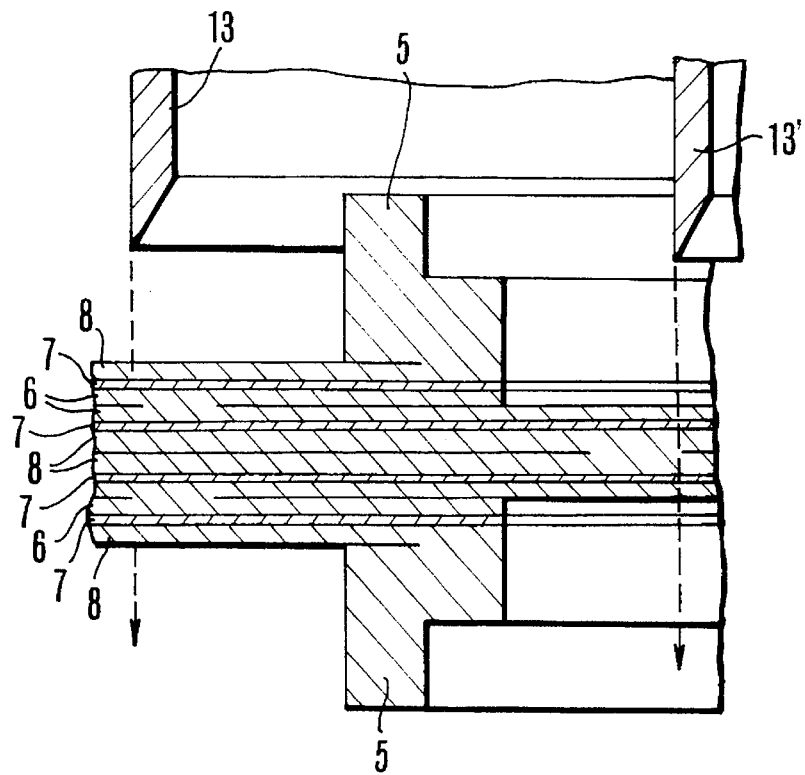
Figure 44:
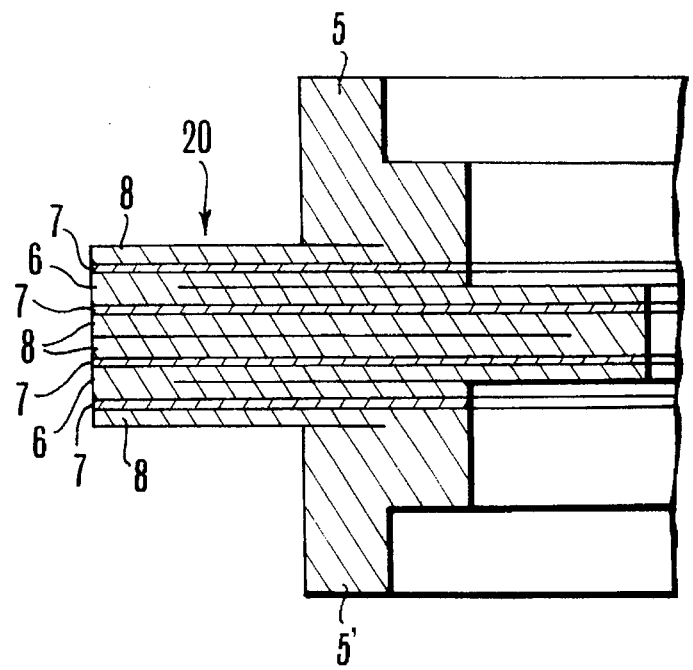

Next, the welded portion of the ring shape explained in FIG. 42 is cut at the inner side thereof as shown in FIG. 43 by moving the cutter 13 in the direction indicated by the arrow shown by the dashed line and pressing it. In such a manner, the above-described two intermediate parts are joined to a unit as shown in FIG. 44. Also, in such a manner, the connection member 20 of bellows state is formed.

Figure 45:
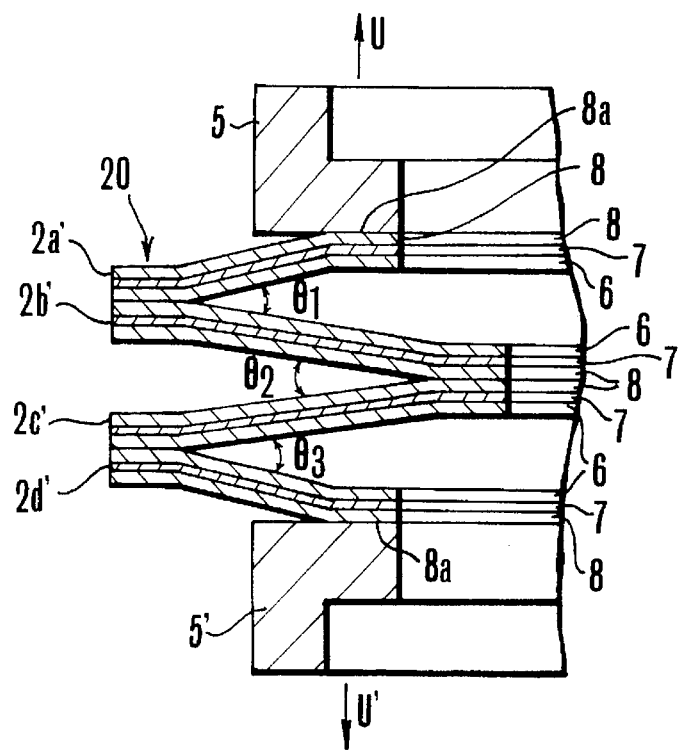

Next, in order that the joined portions of all the elastic components 2a' to 2d' of the connection members 20 as the unified intermediate part are opened to angles $\theta_1$–$\theta_3$ as shown in FIG. 45, that intermediate part is expanded in both directions indicated by the arrows U and U' to the positions in which the parallel flat plates 1 and 1' are fixed. Thus, a connection member 20 of letter "W" shape in cross-section is obtained. It should be noted that the parallel flat plates 1 and 1' must hold themselves in spaced relation by a predetermined distance. By taking this distance as the reference separation, therefore, their locations are controlled. But, the parallel flat plates 1 and 1' each are fixedly supported so as to maintain the reference separation at a predetermined point. Hence, for example, when one pinches the parallel flat plates 1 and 1' at a point on the edge thereof, that pinched place narrows its distance, while the opposite place which is point symmetry with respect to the center of the area of the disc-shaped parallel flat plate 1 or 1' widens its distance. In such a way, the part other than the fixedly supported point of the parallel flat plate 1 or 1' varies the distance of separation.

After this, joining of the parallel flat plates 1 and 1' is carried out by an adhesive agent of resin or rubber system. After the adhesive agent has hardened, to have no leakage is confirmed by helium, leak tester or the like. On end of this confirmation, the transparent substance 3 is poured through an inlet provided on the resin or film, and then that inlet is sealed by a melting or adhering method. Thus, the optical element 20 is completed as shown in FIG. 24.

According to the above-described manufacturing method, the connection member that enables the confronting two parallel flat plates to vary its vertex angle is joined by welding, thereby giving advantages that the reliability of the joint of the connection member is increased and that the manufacturing process can be simplified.

Next, examples of modification of the optical element B are described.

FIG. 46 to FIG. 49 are side sectional views illustrating the respective examples of modification of the optical element B.

Figure 46:
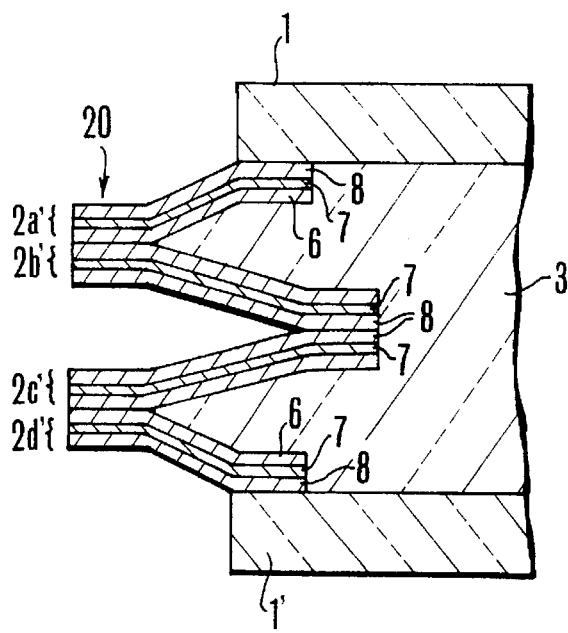
FIG. 46 to FIG. 49 are side sectional views of examples of variation of the optical element B respectively.

To begin with, the first example of modification is described by using FIG. 46.

Polycarbonate or like transparent plastic material is used in the parallel flat plates 1 and 1', and the same sort of material is also used in the elastic components 2a' to 2d' of the connection member 20. By making the materials of the elastic components 2a'–2d', that is, all the mold heat weld joint layers 8 of the laminated film to be the same, for example, polycarbonate film, the support members 5 and 5' for supporting the parallel flat plates 1 and 1' are omitted, and each of the mold heat weld joint layers 8 and 8' of the elastic components 2a' and 2d' are directly joined with the parallel flat plates 1 and 1'.

In the case of this first example of modification, the number of parts of the optical element is decreased. This produces advantages of improving the productivity and simplifying the operation.

Figure 47:
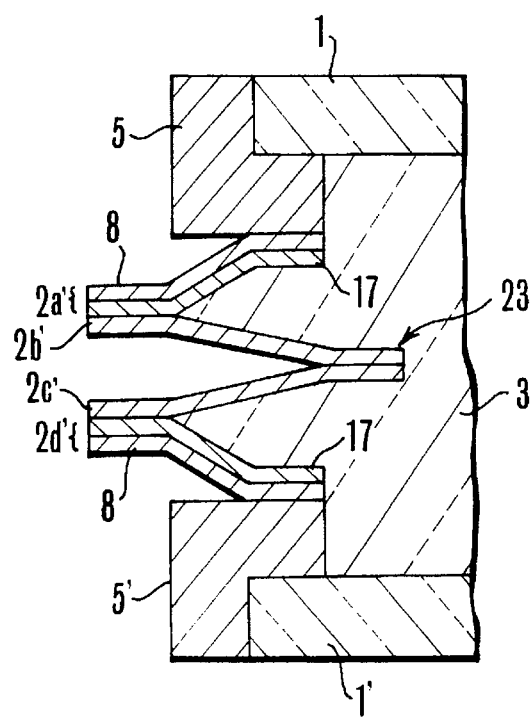

Next, the second example of modification is described by using FIG. 47.

In this second example of modification, by using fluorine-contained film or like film of high barriering property against water vapor and capable of welding, a layer which functions as both of the film heat weld joint layer 6 and the barrier layer 7 is made as the film 17 to form a connection member 23, when the optical element is constructed. As the material of that film 17, CTFE (polychlorotrifluoroethan), FEP (polyperfluoroethylene-propylene), PVDF (polyvinylidene fluoride) and PVDC (polyvinylidene chloride) may be mentioned. In such a way, the elastic components 2a' and 2d' are constructed in 2-layer structure with the film 17 and the mold heat weld joint layer 8, while the intermediate elastic components 2b' and 2c' are constructed with the film 17 only. By this, an advantage is obtained in that the entirety of the optical element is simplified.

Figure 48:
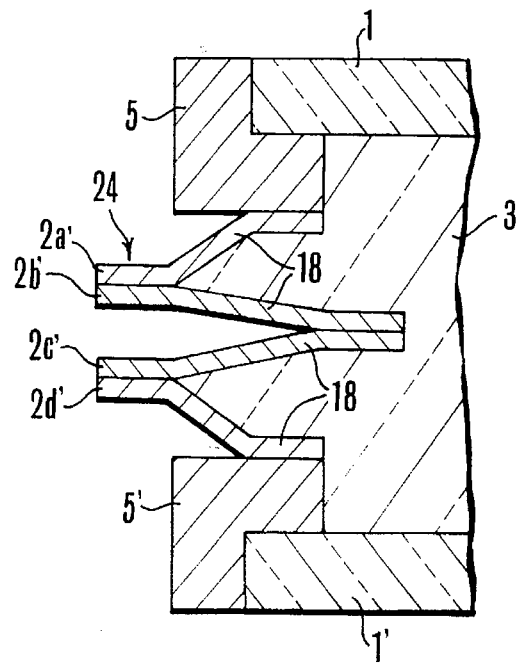

Next, the third example of modification is described by using FIG. 48.

In the third example of modification, the elastic components 2a' to 2d', which constitute the connection member 24, are constructed from a single-layer high-molecular film 18. As the material of the single-layer high-molecular film 18, polyester, polyamide, polycarbonate, polyethylene, etc. can be used.

According to the third example of modification, an optical element having a construction which is further simplified as compared with the second example of modification can be obtained.

Figure 49:
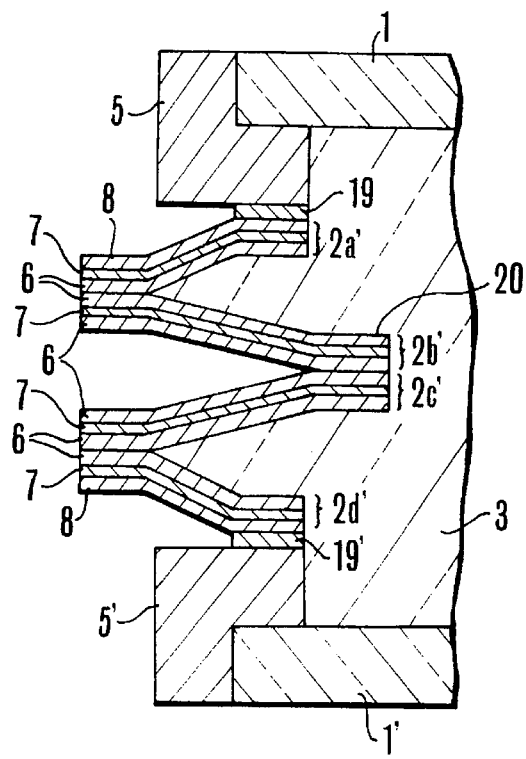

Next, the fourth example of a modification is described by using FIG. 49.

In the above examples of a modification, in a case where the support members 5 and 5' have the reference surfaces for the accuracy of the position of each optical element and a high precision accuracy is required, the support members 5 and 5' may be metallic. For the joining method of the connection member 20 in this case, for example, a hot melt film 19 or 19' or like material of a different sort, which is capable of joining by heating, may be newly inserted in between each of the mold heat weld joint layer 8, 8 of the elastic components 2a' and 2d' and the support member 5, when joining is carried out, as shown in FIG. 49.

Also, instead of heat joining, a usual liquid adhesive agent 19 or 19' may be used when joining. In this case, an advantage of increasing the accuracy of the position of the optical element is produced.

It will be appreciated that according to the fourth example of modification, regardless of whatever material the support member 5 or 5' has, the connection member can be easily joined therewith.

The foregoing first to fourth examples of modification are applicable also to the one-crease or letter "Y" shaped cross-section type of connection member as in the optical element A. Further, if it falls within the spirit and scope of the invention, then they are applicable even in an optical element whose connection member has three or more creases of letter "Y" shape in cross section.

Next, further practical examples are described.

FIG. 50A and FIG. 50B are side sectional views illustrating respective practical examples of forms of the main part of support members. FIG. 51A and FIG. 51B are side sectional views illustrating respective examples of forms of the main part of optical elements.

Support members 15, 15' and 16, 16' are made of the same material as that of the above-described support members 5, 5 each having one of its surfaces that is to join with the mold heat weld joint layer 8, 8 of the respective connection member 2 formed with a spike 40 of triangular cross-section, or a spike 41 of rectangular cross-section. This spike 40 or 41 as the energy director may be placed one to three in number.

Figure 52:
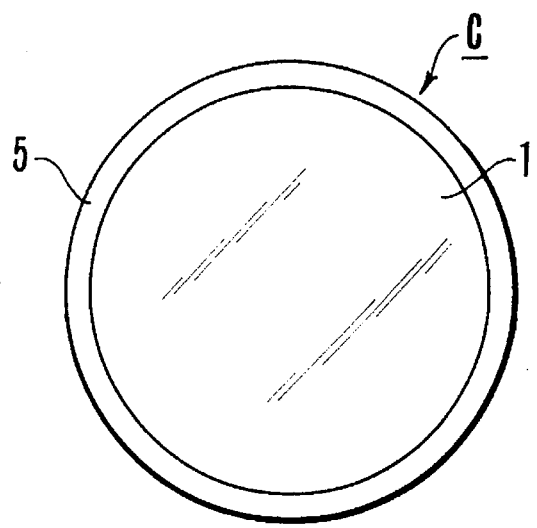
FIG. 52 and FIG. 53 are respectively an elevation view and a cross-sectional view of the main parts of a further embodiment.
Figure 53:
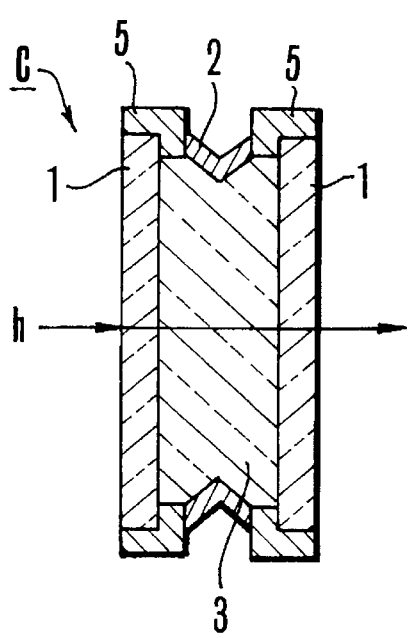
Figure 54:
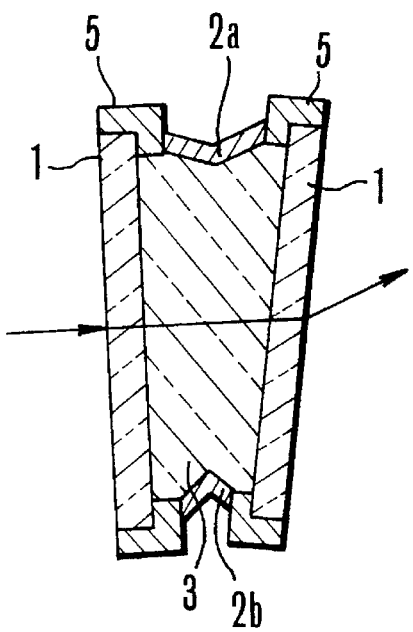
FIG. 54 is similar to FIG. 53 except that the optical element is displaced in part.

FIG. 52 and FIG. 53 depict the other optical element C.

In these figures, reference character C denotes an optical element, and reference numeral 1 denotes an optically transparent parallel flat plate made of glass or plastic material. When no force is applied from the outside, the angle formed from the two parallel flat plates 1 is becoming parallel.

Reference numeral 2 denotes a connection member made of laminated flexible material of, for example, a high-molecular film, an aluminum foil, etc. formed to letter "V" shape and capable of deforming. Also, The connection member 2, as shown in the same figures, is constructed so as to have at least one letter "V" member of the letter "V" shape in the vertical cross-section of the parallel flat plates 1 with its thickness being either constant or different in parts.

Reference numeral 3 denotes an optically transparent liquid substance.

Reference numeral 5 denotes a support member of high rigidity made of, for example, aluminum or plastic mold and supporting the parallel flat plate 1 in enclosing way.

Figure 55A:
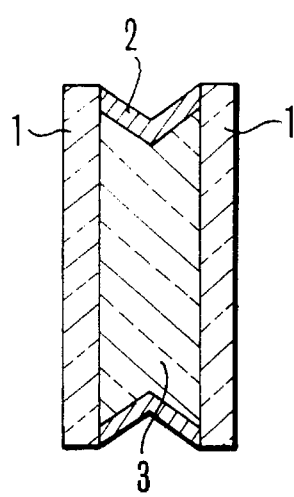
FIGS. 55A, 55B, 55C and 55D are sectional views of examples of variation of the FIG. 52 embodiment.

It should be noted in connection with the present embodiment that in a case where the material of the parallel flat plate 1 is easily joined with the connection member 2, the support member 5 may be omitted as shown in FIG. 55A. According to this, the assembling step can be omitted and a simplification of the optical element can be achieved. Therefore, this modification is desirable.

Figure 55B:
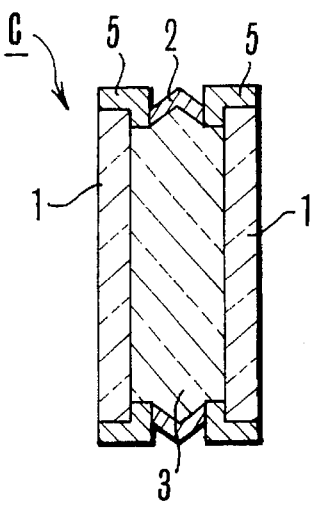

Also, the shape of the cross-section of the connection member 2 may be changed to an inverted letter "V" shape, as shown in FIG. 55B.

If the inverted letter "V" shape is used, as shown in the same figure, the effective diameter of the optical element C can be large. Therefore, it is desirable.

Figure 55C:
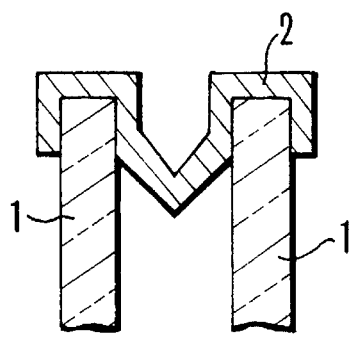

The connection member 2 may be formed to, for example, such a shape as shown in FIG. 55C by molding techniques to allow the parallel flat plates 1 to be fitted therein when they are assembled. According to this, the strength of the joint with the parallel flat plates 1 is increased. Therefore, it is desirable.

Figure 55D:
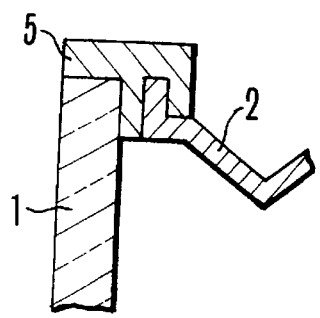

Also, if the support member 5 and the connection member 2 are formed to such shapes as to previously fit with each other as shown in FIG. 55D, an optical element of good joining durability can be obtained.

Next, the effects of the connection member of the optical element of the invention and other practical examples of shapes of the cross-section are described.

Figure 56:
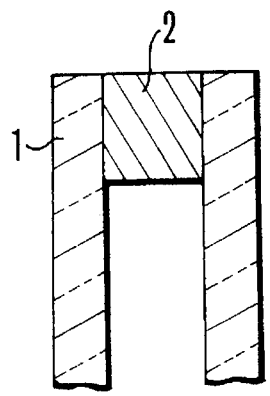

Assuming that the connection member 2 is made by using a flexible material such as rubber or plastic and it is constructed in such a form as in the prior art as, for example, shown in FIG. 56, and is contracted to deform, then the entirety of the connection member 2 of such a shape as shown in FIG. 61 must be made to be such a shape as shown in FIG. 62.

The deformation stress that is exerted at this time works over the entire connection member 2. Therefore, the deformation stress takes a large value.

Figure 57:
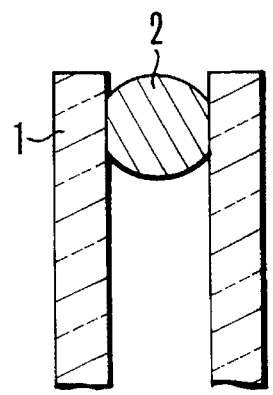

Also, even in a case where the connection member 2 is constructed in such a form as in the prior art as shown in FIG. 57, though the deformation stress becomes more or less small compared with the case of FIG. 56, the driving power for deformation remains large. If, as in the present invention, the form is changed to the letter "V" one as shown in FIG. 60, on the other hand, the driving power necessary to deform it becomes very small, because that driving power which only makes the shape shown in FIG. 63 to deform like a slight bending. That is, because the deformation stress that is exerted at this time lies in a very minute area as shown by the arrow o#FIG. 64, the driving power for deformation becomes far smaller than in the cases of FIG. 56 and FIG. 57.

Besides this, in the present embodiment, the connection member may be made to be a bellow form having a plurality of letter "V" members as shown in FIG. 59, wherein the driving power for deformation is small. So this is good. Also, it may be constructed in the letter "U" form as developed from the letter "V" form as shown in FIG. 58. In this case, the driving power for deformation is an almost mean value of those of the connection member shown in FIG. 56 and the connection member shown in FIG. 60. That is, the resultant driving power for deformation becomes like the mixture of both components of the contraction and the bending.

In the present embodiment, the wall thickness of the letter "V" member of the connection member 2 is, in the case of using, for example, flexible material, desirably about 0.01–0.5 mm. That is, when it becomes more than 0.5 μmm, because the deformation stress σ shown in FIG. 64, though being minute, increases with increase of the thickness, the driving power for deformation becomes too large, so a driving power source of larger capability than necessary must be used. Also, when it becomes below 0.01 mm, the internal pressure due to the substance 3 sealed in the interior of the optical element becomes difficult to hold good shape of the connection member 2 itself, and the strength and the bending durability of the connection member 2 lower. Further, the strength of adhesion and the durability of the joint with the parallel flat plate 1 also deteriorate. These will invite a breakage of the optical element with some possibility. So it is no good.

Also, in the present embodiment, when the connection member is deformed, the portion being apt to bend is the central portion of the letter "V" member. For this reason, it is desirable that the thickness of this portion is made thinner than that of the other as, for example, shown in FIG. 65 and FIG. 66, because the driving power for deformation becomes smaller. It is also desirable that the other portion than the central portion is made thicker, because the joining property with the parallel flat plate 1 becomes advantageous.

That is, it is desirable that the letter "V" member be constructed from a member whose thickness differs in parts in the point of view of the durability and the driving operation.

Next, the result of the simulation about the concrete relative value Fy of the driving power of the connection member in the present embodiment is shown in FIG. 71 to FIG. 74.

Figure 67:
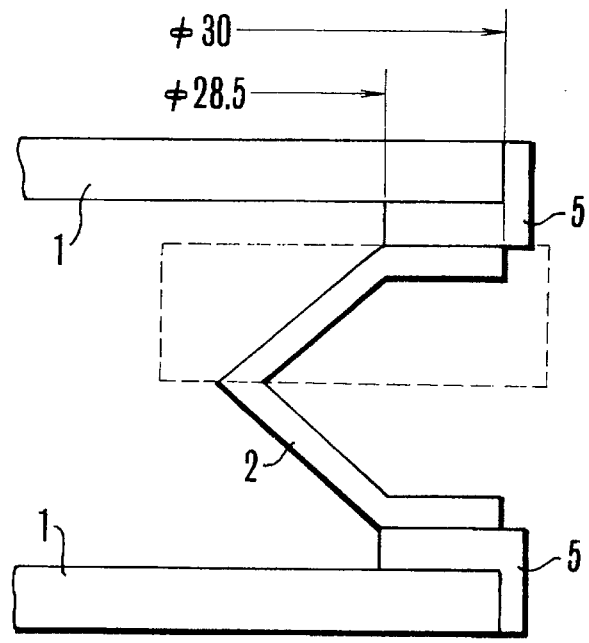
FIG. 67 is a sectional view of the connection member and its neighborhood used in the simulation on the driving force at the joined portion in the invention.
Figure 71:
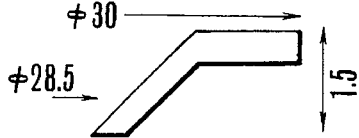
Figure 71:
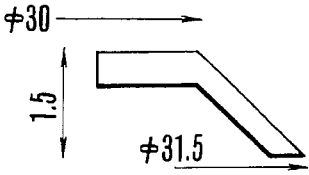
Figure 71:
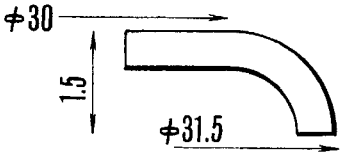

The connection member is formed to the letter "V" shape in cross-section shown in FIG. 67. The number of demands per section is about 100. The material is silicone rubber. Poisson's ratio σ=0.4999. Also, in order to compare the driving power of only the letter "V" portion of the connection member 2, the inner and outer diameters of the joining surface with the support member 5 are set to φ28.5 mm and φ30 mm respectively as shown in FIG. 66, and the spacing between the joining surfaces of the connection member is set to 3 mm. Incidentally, for the purpose of simplicity, only that portion which is enclosed by the dashed line of FIG. 67 is shown in FIG. 71 to FIG. 74. Also, for the purpose of reference, even the case of letter "U" shape in cross-section is shown in FIG. 71.

FIG. 71 shows the cases that the shape of cross-section of the connection member 2 is letter "V", inverted letter "V" and letter "U". In the letter "V" shape and the inverted one, their relative values of the driving power are almost equal to each other. But, when the shape is changed to letter "U", the driving power becomes about 1.5 times larger.

Figure 68:
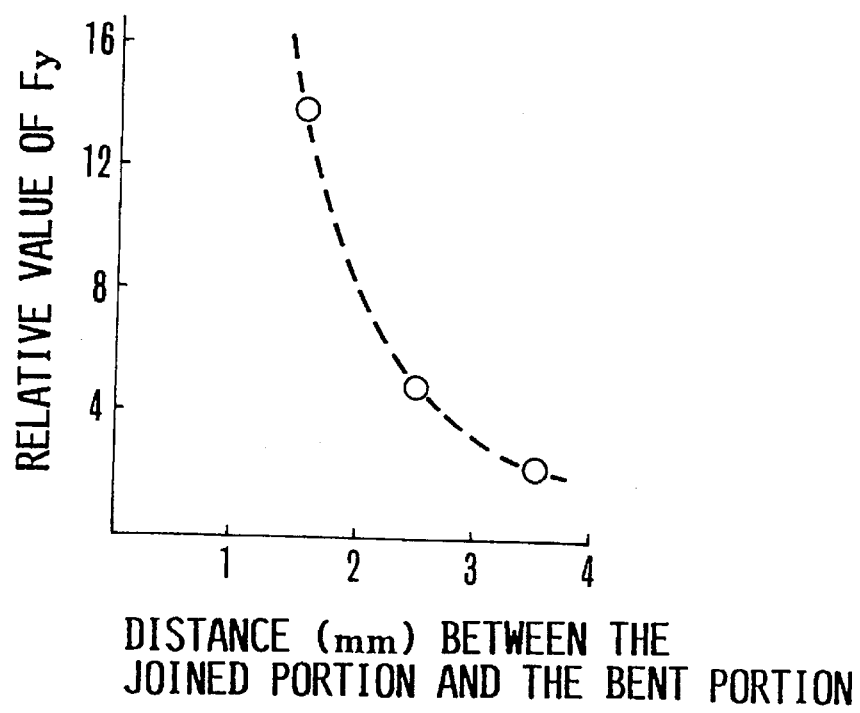
FIG. 68, FIG. 69 and FIG. 70 are graphs to explain the variation of the driving force on the connection member of the optical element of the invention.
Figure 72:
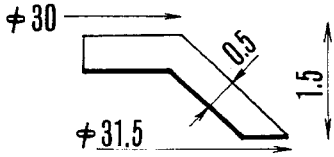
Figure 72:
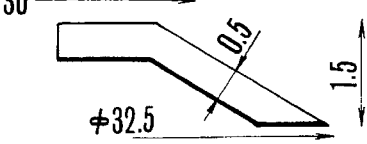
Figure 72:
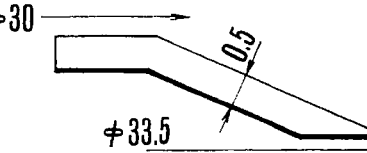

FIG. 72 shows the cases where the distance from the joined portion to the bent portion is made to vary by varying the bending angle of the letter "V" shape. The longer the distance between the joined portion and the bent portion, the smaller the driving power becomes, as shown in FIG. 68.

Figure 69:
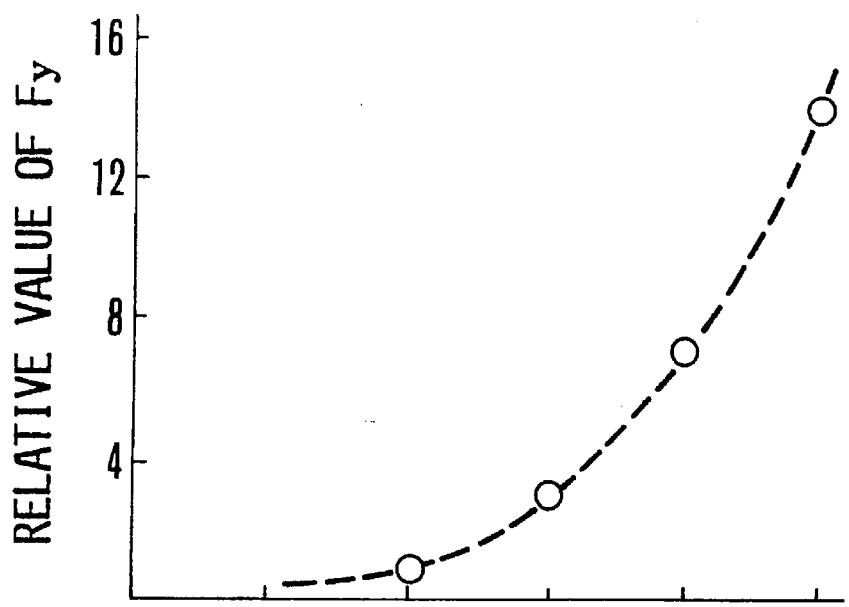
Figure 70:
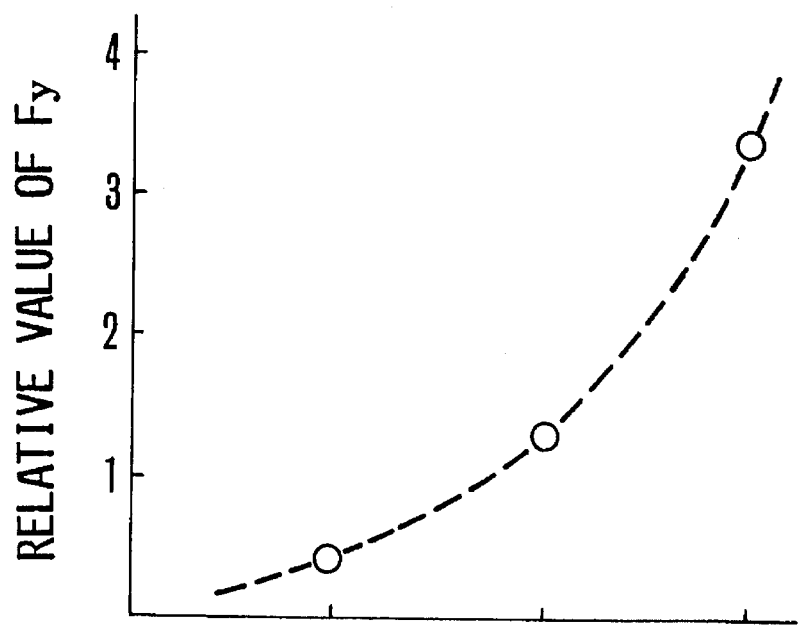

FIG. 73 shows the cases where the thickness of the letter "V" member is varied. The thinner the thickness of the connection member 2, the smaller the driving power becomes, as shown in FIG. 69.

According to the result of analysis of the structure by the finite element method used in the present embodiment, when the connection member is made in the letter "V" shape, the driving power increases at $t^3$ where t is the thickness. For this reason, in the present embodiment, as has been described before, the thickness of the connection member is set to not more than 0.5 mm by taking into account the durability and fidelity, so that the driving power is made as small as possible°

Figures 74, 75, 76:
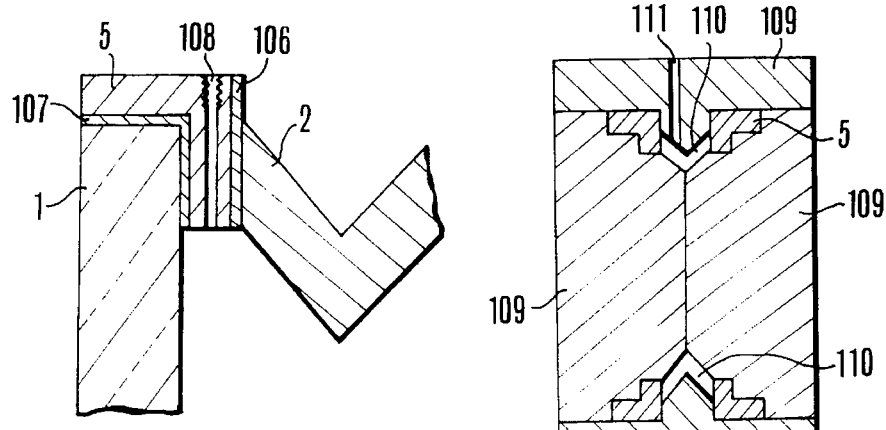

FIG. 74 shows the cases where the thickness of the letter "V" member is given distribution. The smaller the thickness ratio, that is, the thinner the thickness of the bending portion side compared with the joining portion side, the smaller the driving power becomes, as shown in FIG. 74.

It is to be noted that the connection member 2 in the present embodiment may be made of any material whatever, provided, as has been described before, the shape of vertical cross-section has at least one letter "V", and it is flexible. For example, thermoplastic and thermosetting resins such as polyethylene, polypropylene, polyester, polyvinyl chloride, polyamide, polystyrene, polyisobutylene, polycarbonate, polyvinylidene chloride, polyvinyl acetal, polymethyl metacrylate, polyacrylonitryl, polyimide, cellulose system, fluoride resins, epoxy, silicone resin, polyurethane, and their copolymers, and ones including plasticizer or filler, may be used. Also, rubbers such as chloroprene rubber, styrene-butadiene rubber, nitryl rubber, butyl rubber, silicone rubber, butadiene rubber, fluoride-contained rubber, urethane rubber, isoprene rubber and thermoplastic elastomer such as polyethylene, polystyrene, polyurethane, polyamide and polyester can be applied.

Among these, relatively soft ones, for example, rubbers and thermoplastic elastomer are well suited in the point of view of adhesion, liquid tightness and expansion-contraction durability. Though it is hard, the thermoplastic or thermosetting resin when molded to thin the thickness has ductility. So these materials are also desirable provided, in addition to the above-described properties, the shape is properly set, because the driving power for deformation can be made smaller.

Particularly, silicone rubber or fluoride rubber or butyl rubber is most desirable because the joining method is established and on consideration of the properties that the adhesion is good, resistance to liquid is high, the expand-contraction durability is strong, and the driving power for deformation is small.

Besides these, it may be constructed from aluminum, copper, stainless or like metal foil or laminate of the before-described plastic film and metal foil.

As the optically transparent substance 3, for example, alcohols such as ethyl alcohol and ethylene glycol, alkyl halide such as carbon tetrachloride, chloroform and ethylene bromide, organic acids such as formic acid and acetic acid, esters such as methyl acetate, and ethyl acetate are applicable. In addition, ether, keton, low-molecular weight polyether, low-molecular weight polyester, organic liquid such as aromatic compounds, and solutions obtained by dissolving solid in the above-described liquid, mixtures of the above-described liquids, and further transparent viscous liquid such as fluid paraffin and silicone oil are also applicable. From among these, by considering the properties that solidification or vaporization does not occur within the range of temperatures at which the optical element is used and the refractive index is hardly susceptible to change with temperature, etc., silicone oil is most suited. Particularly, dimethyl silicone, methylphenyl silicone, diphenyl silicone and florosilicone are desirable.

It is to be noted that each of the materials for use in the connection member 2 must be selected by considering that it cannot be dissolved in, or swelled by the substance 3. For example, to silicone rubber, the desirable combination is with florosilicone oil, or to the fluoride rubber, with dimethylsilicone oil.

For the support member 5, material which is easy to join with the connection member 2 is good. Also, it is preferable that the support member 5 is given a surface for determining the position when the optical element is incorporated into a camera or like optical instrument, or screw-threaded holes for fasteners, because the assembling operation becomes easy.

Another method of manufacturing the optical element C, shown in FIG. 53, is described by reference to FIG. 75 and those that follow.

In FIG. 75, reference numerals 106 and 107 each denote an adhesive agent layer. The adhesive agent layer 106 is joining the connection member 2 with the support member 5, and the adhesive agent layer 107 is joining the parallel flat plate 1 with the support member 5. A pouring mouth 108 for the liquid or gel substance is provided in a portion of the support member 5. After the optically transparent substance has been sealed in the space formed by the two parallel flat plates 1, the mouth 108 is closed by a screw.

The connection member 2 according to the present embodiment, as has been described before, is constructed in the cross-sectional structure of letter "V" shape or letter "U" shape by using a high-molecular material. By such a construction, the required angle to which the connection member 2 is bent is decreased as shown in FIG. 53 with an advantage that the driving power for deformation of the optical element A is minimized.

Also, in a case where glass material is used in the parallel flat plate 1, if the support member 5 is formed to letter "L" shape, it is easy to support the glass plate 1. As the material, from the standpoint that it has a strong adhesion with the connection member 2 and the joining operation is easy to carry out, and when incorporated into the optical element, the increase in weight is small, aluminum is preferable.

At first, the support member 5 made of aluminum and machined to high precision accuracy is prepared two in number. To these support members 5, the connection member 2 of silicone rubber, which was produced by the pour molding or transfer molding technique, is joined by the adhesive agent layer 106, as shown in FIG. 75. In this case, the adhesive agent is desirably of the same sort as that of the connection member 2, for example, of the silicone system. As necessity arises, that surface of the support member 5 that is to join desirably is treated with primer, because the adhesion becomes stronger and steadier.

Another method may be used as shown in FIG. 76, the support member 5 is carried by a metal mold 109 divided into a plurality of parts, and high-molecular material or rubber material which is either liquid before molded, or plasticized by heating to high temperature is poured through a gate 111 into a void 110 formed by the metal mold 109, thus carrying out joining at the same time when the connection member 2 is molded. It is to be noted that at this time too, a primer treating agent such as metal catalyst-contained silane coupling agent is applied to the corresponding position to the place of the adhesive agent layer 106 and baked as shown in FIG. 75.

Next, the parallel flat plate 1 is accurately fitted through the adhesive agent layer 107 in the support member 5 with a slight clearance therebetween as shown in FIG. 75. Thus, they are joined with each other. Lastly, the substance 3 of transparent liquid or gel is poured through a liquid conduit 108 previously provided in the support member 5. After that, the mouth of the conduit 108 is closed in screw-threaded manner.

Figure 77:
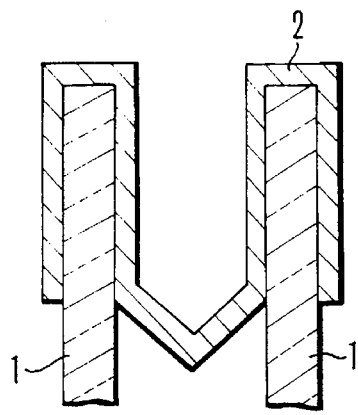
FIG. 77 to FIG. 83 are sectional views of other examples of the joint of the connection member of the optical element of the invention.

Further, if the connection member 2 is made to have such a shape that the parallel flat plate 1 can be fitted deep as shown in FIG. 77, the joining durability can be more improved because the joined area is widened.

Figure 78:
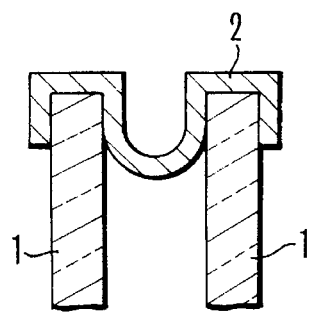

In general, when the connection member 2 expands or contracts by driving power, the force concentrates mainly on the bent portion of the letter "V" shape shown in the sectional view. For this reason, as the driving time increases, or the number of repetitions increases, deterioration starts from that bent portion and there is high possibility that it will break. On this account, depending on the quality of the material of the connection member 2, it is recommended to use the letter "U" shaped cross-section as shown in FIG. 78 so that when expanding and contracting, the driving power is prevented from gathering to one point. This is particularly effective in improving the durability of the connection member 2.

Figure 79:
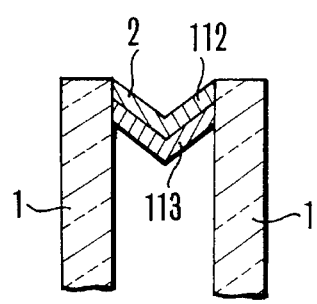

In a case where the connection member 2 is liable to be swelled by the substance (liquid) 3, or where the substance 3 is apt to ooze out, it is better to construct the connection member 2 in the 2-layer structure as shown in FIG. 79. At this time, it is recommended that the layer of high-molecular material 112 be laminated on a layer of high-molecular material 113 of high resistance to liquid when constructing the connection member 2.

Figure 80:
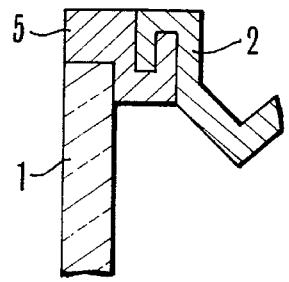
Figure 81:
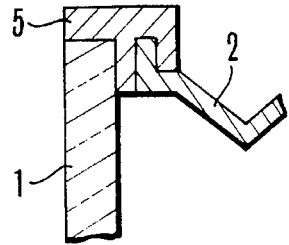

If the support member 5 is constructed in such a form as to expect that it fittingly engages with the connection member 2, as shown in FIG. 80 or FIG. 81, an advantage of improving the joining durability is produced.

Figure 82:
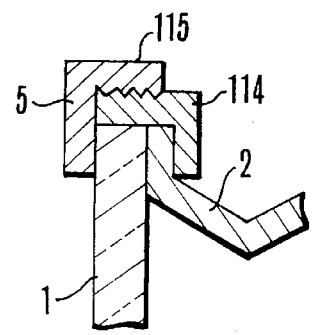

Besides this, the support member may be prepared in two parts 114 and 115 as shown in FIG. 82. After the connection member 2 has been joined with the parallel flat plate 1 fittingly by one support member 114, the other support member 115 is tightened on the support member 114 by their screw-threaded connection. The use of such a construction enables the parallel flat plate 1 and the connection member 2 to join with each other more strongly and steadily.

Figure 83:
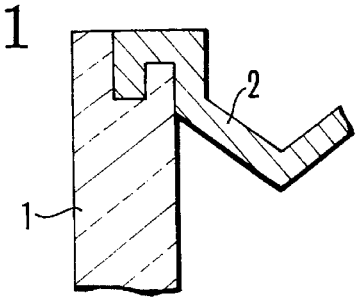

Also, if the parallel flat plate 1 is previously formed to a fit shape by machining or plastic molding, so that it can join directly with the connection member 2 as shown in FIG. 83, the support member 5 can be omitted and moreover a high joining strength can easily be obtained.

It is to be noted that, when constructing in the forms shown in FIG. 77 to FIG. 83, the joining method may employ adhesive agent, treatment with primer, etc. Also, the method in which the joining is carried out at the same time that the connection member 2 is molded may be used.

As has been described above, according to the present invention, when an optical element in the form of the variable angle prism body is constructed in such a manner that two transparent parallel flat plates are arranged in surface to surface confronting relation, and joined with each other by a connection member so as to create an internal space into which a transparent substance is poured and sealed, the connection member is constructed from a high-molecular material capable of deforming and amenable to the molding technique as has been described before. Thereby, it is made possible for the optical element to achieve realization of an excellent durability of the joined portion and moreover easy variation of the vertex angle formed by the two parallel flat plates by a small driving power to vary the optical performance.

Also, since the driving power for the optical element can be lowered, the size and weight of the drive source and electric power source of the optical instrument to which the optical element is intended to be introduced can be minimized. Therefore, it is possible that such an optical element is built even in the small-sized popular camera to which any image stabilization optical system could not up to now be applied and made a commercial product.

Further, according to the invention, by employing the method of joining at the same time that the connection member is molded, an optical element having the features that its fidelity is enhanced and at the same time it is amenable to a simplified unit production technique, etc. can be achieved.

What is claimed is:

1. An optical element in which an optically transparent substance is sandwiched between transparent paired plate-shaped elements by utilizing a connection member capable of deforming, and the angle formed by said paired plate-shaped elements is caused to vary by a force applied thereto from the outside, whereby a predetermined optical characteristic for a passing light ray is obtained, wherein said connection member is constructed from a high-molecular weight polymeric material that is capable of being molded and said optically transparent substance comprises silicone oil or modified silicone oil.

2. An optical element made to obtain a predetermined optical characteristic for the passing light rays by deforming a connection member connecting optically transparent paired plate-shaped elements and adjusting the vertex angle of said paired plate-shaped elements formed by said deformation, said optical element wherein said connection member is constructed by coupling a plurality of elastic members, and said elastic members are connected in such a way as each to become a letter "Y" shape in cross-section.

3. An optical element made to obtain a predetermined optical characteristic for the passing light rays by sandwiching an optically transparent substance between transparent paired plate-shaped elements by utilizing a connection member capable of deforming and varying the angle formed by said paired plate-shaped elements by a force applied thereto from the outside, said optical element wherein said connection member is constructed in such a way as to have at least one letter "V" member of letter "V" shape in the cross-section vertical to said plate-shaped elements.

4. An optical element according to claim 3, wherein said letter "V" member of said connection member is constructed with a film thickness of 0.01–0.5 mm.

5. An optical element according to claim 4, wherein said letter "V" member of said connection member is constructed from a member of partly different film thicknesses.

6. An optical element, for passing light rays, comprising:

transparent paired plate-shaped elements;

an optically transparent liquid sandwiched between said transparent paired plate-shaped elements;

a connection member connecting said transparent paired plate-shaped elements, said connection member capable of being deformed, wherein a predetermined amount of optical refraction for the passing light rays is obtained by varying an angle formed by said paired plate-shaped elements by a force applied thereto from the outside of said optical element, and wherein at least a portion of said connection member comprises a rubber film, and wherein a cross-section of said connection member has a Y-shape or a V-shape.

7. An optical element according to claim 6, wherein said rubber film is selected from the group consisting of silicone rubber, fluorine-contained rubber, and butyl rubber.

8. An optical element, for passing light rays, comprising:

transparent paired plate-shaped elements;

an optically transparent liquid sandwiched between said transparent paired plate-shaped elements;

a connection member connecting said transparent paired plate-shaped elements, said connection member capable of being deformed, wherein a predetermined amount of optical refraction for the passing light rays is obtained by varying an angle formed by said paired plate-shaped elements by a force applied thereto from the outside of said optical element, and wherein at least a portion of said connection member comprises a thermoplastic resin film, and wherein a cross-section of said connection member has a Y-shape or a V-shape.

9. An optical element according to claim 8, wherein said thermoplastic resin film is selected from the group consisting of polyethylene, polystyrene, polyamide, and polyester.

10. An optical device comprising:

transparent paired plate-shape elements;

an optically transparent substance comprising at least one of water, alcohol, glycol, silicone oil, modified silicone oil, and silicone rubber that is sandwiched between said transparent paired plate-shaped elements;

a connection member connecting said transparent paired plate-shaped elements, said connection member capable of being deformed, wherein a predetermined optical characteristic for passing light rays is obtained by varying an angle formed by said transparent paired plate-shaped elements by a force applied thereto from the outside of said optical device, and wherein said connection member comprises a plurality of layers, at least one of said plurality of layers being made of a thermally adhesive material.

11. An optical device according to claim 10, wherein said connection member comprises a plurality of portions that are mutually bound to each other.

12. An optical device according to claim 10, further comprising a member that binds said connection member and an optically transparent element.

13. An optical device according to claim 10, wherein said connection member and an optically transparent element are directly bound to each other.

14. An optical device according to claim 10, wherein said transparent substance comprises a silicone oil or modified silicone oil.

15. An optical device according to claim 14, wherein said silicone oil is selected from the group consisting of dimethyl silicone oil, methylphenyl silicone oil, diphenyl silicone oil and fluorosilicone oil.

16. An optical device comprising:

transparent paired plate-shaped elements;

an optically transparent substance sandwiched between said transparent paired plate-shaped elements; and a connection mender connecting said transparent plate-shaped elements, said connection member capable of being deformed, wherein a predetermined optical characteristic for a passing light ray is obtained by varying an angle formed by said transparent paired plate-shaped elements by a force applied thereto from the outside of said optical device, and wherein said connection member has at least one v-shaped portion.

17. An optical device according to claim 16, wherein said connection member is formed by binding a plurality of sub-members, and said v-shaped portion is formed by binding a pair of sub-members.

18. An optical device according to claim 17, wherein said sub-members are thermally bound.

19. An optical device according to claim 16, which further comprises a member that binds said connection member and an optically transparent element.

20. An optical device according to claim 16, wherein said connection member and an optically transparent element are directly bound to each other.

21. An optical device according to claim 16, wherein said transparent substance comprises a silicone oil or modified silicone oil.

22. An optical claim according to claim 21, wherein said silicone oil is selected from the group consisting of dimethyl silicone oil, methylphenyl silicone oil, diphenyl silicone oil and fluorosilicone oil.

* * * * *

UNITED STATES PATENT AND TRADEMARK OFFICE
CERTIFICATE OF CORRECTION

PATENT NO. : 5,589,239     Page 1 of 3
DATED : December 31, 1996
INVENTOR(S) : HARUO TOMONO, ET AL.

It is certified that error appears in the above-indentified patent and that said Letters Patent is hereby corrected as shown below:

ON THE TITLE PAGE:

[56] References Cited

U.S. PATENT DOCUMENTS

"De La Ciesva" should read --De La Cierva--.

COLUMN 4

Line 10, "silicones" should read --silicone--.

COLUMN 5

Line 1, "a" should read --an--.

COLUMN 6

Line 28, "thickness" should read --thickness is--.

COLUMN 11

Line 39, "and and" should read --and--.

UNITED STATES PATENT AND TRADEMARK OFFICE
CERTIFICATE OF CORRECTION

PATENT NO. : 5,589,239
DATED : December 31, 1996
INVENTOR(S) : HARUO TOMONO, ET AL.

It is certified that error appears in the above-indentified patent and that said Letters Patent is hereby corrected as shown below:

COLUMN 14

Line 33, "a modification" should read --modification--.

COLUMN 15

Line 17, "The" should read --the--.
Line 62, "stress" should read --stress $\sigma$--.

COLUMN 16

Line 7, "stress" should read --stress $\sigma$--.
Line 9, "o#FIG. 64," should read --of FIG. 64,--.

COLUMN 17

Line 29, "possible°" should read --possible.--.
Line 43, "metacrylate," should read --methacrylate,--.

UNITED STATES PATENT AND TRADEMARK OFFICE
CERTIFICATE OF CORRECTION

PATENT NO. : 5,589,239
DATED : December 31, 1996
INVENTOR(S) : HARUO TOMONO, ET AL.

It is certified that error appears in the above-indentified patent and that said Letters Patent is hereby corrected as shown below:

COLUMN 18

Line 21, "florosilicone" should read --fluorosilicone--.
Line 26, "florosilicone" should read --fluorosilicone--.

Signed and Sealed this

Fifth Day of August, 1997

Attest:

BRUCE LEHMAN

Attesting Officer

Commissioner of Patents and Trademarks